United States Patent
Telang

(10) Patent No.: US 10,324,893 B1
(45) Date of Patent: Jun. 18, 2019

(54) BACKUP APPLICATION CATALOG ANALYZER

(75) Inventor: Nilesh Telang, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 617 days.

(21) Appl. No.: 13/327,397

(22) Filed: Dec. 15, 2011

(51) Int. Cl.
*G06F 16/11* (2019.01)
*G06F 16/13* (2019.01)

(52) U.S. Cl.
CPC .......... *G06F 16/125* (2019.01); *G06F 16/137* (2019.01)

(58) Field of Classification Search
CPC ........ G06F 17/30073; G06F 17/30085; G06F 17/30088; G06F 17/30097; G06F 17/30159; G06F 11/1448; G06F 11/1451; G06F 11/1453
See application file for complete search history.

(56) References Cited

U.S. PATENT DOCUMENTS

| | | | |
|---|---|---|---|
| 7,330,997 B1 * | 2/2008 | Odom ................. | G06F 11/1464 711/162 |
| 7,363,326 B2 * | 4/2008 | Margolus ...................... | 707/663 |
| 7,680,830 B1 * | 3/2010 | Ohr et al. ................. | 707/999.2 |
| 7,693,877 B1 * | 4/2010 | Zasman ........................ | 707/707 |
| 9,256,381 B1 * | 2/2016 | Fultz .................... | G06F 3/0611 |
| 2005/0055518 A1 * | 3/2005 | Hochberg et al. ............ | 711/159 |
| 2005/0055519 A1 * | 3/2005 | Stuart ............... | G06F 17/30082 711/159 |
| 2005/0273476 A1 * | 12/2005 | Wertheimer et al. ......... | 707/204 |
| 2006/0282629 A1 * | 12/2006 | Stuart et al. ................... | 711/159 |
| 2007/0050423 A1 * | 3/2007 | Whalen et al. ............... | 707/200 |
| 2007/0185936 A1 * | 8/2007 | Derk et al. ..................... | 707/204 |
| 2008/0091725 A1 * | 4/2008 | Hwang et al. ............. | 707/104.1 |
| 2008/0126431 A1 * | 5/2008 | Walliser ............. | G06F 11/1451 707/200 |
| 2008/0244204 A1 * | 10/2008 | Cremelie et al. ............. | 711/162 |
| 2008/0263112 A1 * | 10/2008 | Shaath et al. ................. | 707/204 |
| 2008/0307527 A1 * | 12/2008 | Kaczmarski et al. .......... | 726/24 |
| 2009/0083563 A1 * | 3/2009 | Murase ......................... | 713/324 |
| 2009/0119354 A1 * | 5/2009 | Stuart et al. ................... | 707/206 |
| 2010/0070734 A1 * | 3/2010 | Agombar et al. ............ | 711/171 |
| 2010/0106933 A1 * | 4/2010 | Kamila et al. ................ | 711/171 |
| 2010/0281081 A1 * | 11/2010 | Stager et al. ................. | 707/814 |
| 2012/0150827 A1 * | 6/2012 | Ishii .................. | G06F 17/30156 707/692 |

* cited by examiner

*Primary Examiner* — Marc S Somers
(74) *Attorney, Agent, or Firm* — Campbell Stephenson LLP

(57) ABSTRACT

The present disclosure provides for analyzing data stored in a data protection storage system to determine a prospective storage scheme that provides a more efficient use of storage resources in the data protection storage system. Data can be analyzed to identify a set of data suitable for long term storage in an archive. Data can be analyzed to identify a set of data suitable for deletion to reduce duplicate copies of data, and remove expired data. Protection policies that provide double coverage of data, causing additional inefficient storage of data, can be identified. A prospective amount of freed storage and other savings can be calculated, if all or part of the prospective storage scheme is implemented, where the prospective amount of freed storage and other savings can be displayed to in a report. A prospective storage scheme may also be determined for a client system that stores live data.

19 Claims, 12 Drawing Sheets

| Catalog 320 | | | |
|---|---|---|---|
| File path name 805 | Modification time 810 | User name 815 | Group name 820 |
| Catalog entry for file F(1) 825(1) | | | |
| Catalog entry for file F(2) 825(2) | | | |
| ⋮ | | | |
| Catalog entry for file F(N) 825(N) | | | |

| Catalog Analysis Table 340 | | | | | |
|---|---|---|---|---|---|
| Client name 905 | Policy name 910 | Data hash 915 | Data size 920 | Image ID list 925 | File name 930 |
| Entry E(1) for unique file 935(1) | | | | | |
| Entry E(2) for unique file 935(2) | | | | | |
| ⋮ | | | | | |
| Entry E(N) for unique file 935(N) | | | | | |

| Catalog Analysis Table 340 |||||||
|---|---|---|---|---|---|---|
| Client name 905 | Policy name 910 | Data hash 915 | Data size 920 | Image ID list 925 | File name 930 | Segment hash list 940 |
| Entry E(1) for unique file 935(1) ||||||||
| Entry E(2) for unique file 935(2) ||||||||
| ⋮ ||||||||
| Entry E(N) for unique file 935(N) ||||||||

*Fig. 9B*

| Segment Analysis Table 1000 |||||
|---|---|---|---|---|
| Client name 1005 | Policy name 1010 | Segment hash 1015 | Segment size 1020 | Segment occurrence count 1025 |
| Entry for unique segment data D(1) 1030(1) |||||
| Entry for unique segment data D(2) 1030(2) |||||
| ⋮ |||||
| Entry for unique segment data D(N) 1030(N) |||||

*Fig. 10*

BACKUP APPLICATION CATALOG ANALYZER

FIELD OF THE INVENTION

This invention relates generally to data protection storage systems, and, more particularly, to analyzing data stored in a data protection storage system.

DESCRIPTION OF THE RELATED ART

In case of data loss, an organization can implement a backup application to backup or protect data located on various computing devices of the organization. While backup images of the data can be retained for long periods of time, backup images provide inefficient long term retention of data. Users (e.g., system administrators) that are unsure of an appropriate expiration date for backup images will allow such backup images to persist indefinitely in order to avoid accidental deletion of important data. Since backup images are created on a recurring basis, the continued storage of an ever-growing number of backup images can take up significant storage resources of the organization. This long term retention of backup images can result in an inefficient use of storage resources, especially if the same data is repeatedly copied and stored in multiple backup images, and even repeatedly copied and stored in each backup image.

If backup images are held indefinitely, storage resources of the organization can quickly reach full capacity. Often, an administrator may not be made aware of the danger of running out of storage space until the backup application has indicated that a backup has failed due to lack of storage space. An administrator can manually delete old backup images, but may be unable to quickly or accurately identify old backup images that are candidates for deletion. Administrators that are averse to inaccurate deletion of backup images, which can lead to accidental deletion of important data, may instead add storage resources to provide additional storage space. An administrator may also avoid manual deletion due to the time consuming and labor intensive nature of manual deletion. However, installation of additional storage resources can also be time consuming and labor intensive, as well as financially expensive. Thus, maintaining numerous backup images on limited storage resources for the sake of long term retention of data is inefficient and can be expensive in many ways for an organization.

SUMMARY OF THE INVENTION

The present disclosure provides for analyzing data stored in a data protection storage system to determine a prospective storage scheme that provides a more efficient use of storage resources in the data protection storage system. Rather than using backup images for long term storage of client data, the present disclosure analyzes client data to identify a set of client data that is suitable for long term storage in an archive. The present disclosure also analyzes client data to identify a set of client data that is suitable for deletion in order to reduce duplicate copies of client data, as well as expired client data. The present disclosure also identifies policies that provide double coverage of client data and thus cause additional inefficient storage of client data. The present disclosure also calculates a prospective amount of freed storage and other savings, if all or part of the prospective storage scheme is implemented. The prospective amount of freed storage and other savings can be displayed to a user in a report. A prospective storage scheme can also be determined for a client system that stores live client data.

BRIEF DESCRIPTION OF THE DRAWINGS

The present disclosure may be better understood, and its numerous objects, features and advantages made apparent to those skilled in the art by referencing the accompanying drawings.

FIG. 9B is a block diagram illustrating relevant components of an example catalog analysis table for a segment level analysis process, according to one embodiment.

FIG. 10 is a block diagram illustrating relevant components of an example segment analysis table for a segment level analysis process, according to one embodiment.

Figure 1:
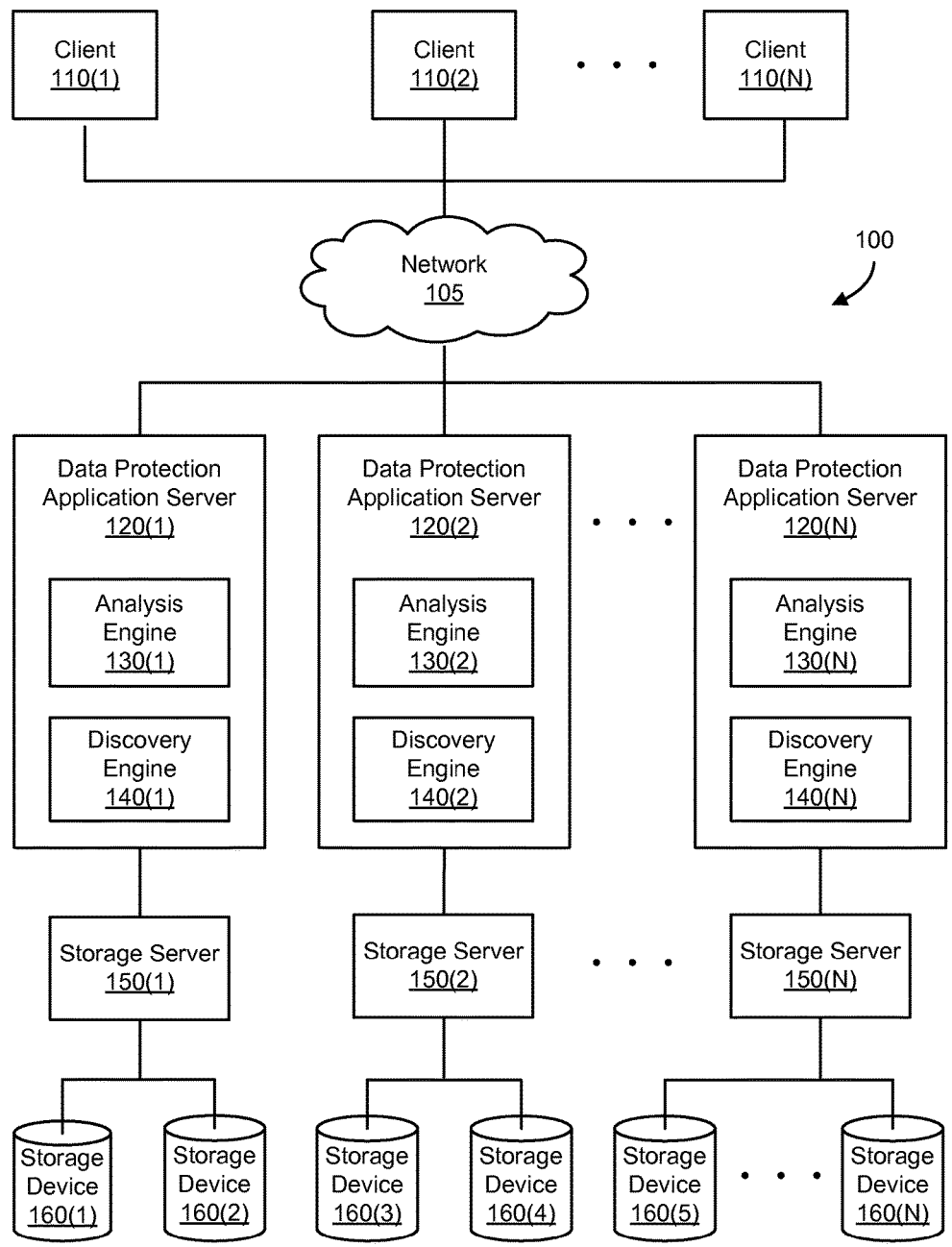
FIG. 1 is a block diagram illustrating relevant components of an example data protection storage system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

FIG. 1 is a block diagram illustrating relevant components of an example data protection storage system 100, also referred to herein as a storage system, in which the present disclosure can be implemented. A data protection storage system implements a data protection application (not shown) providing one or more backup, archive, and restore capabilities. Examples of a data protection application include Symantec NetBackup and Enterprise Vault (an extension of NetBackup), and other third-party vendor software. A data protection application can be implemented as a client-server application, with a server component (not shown) residing on a data protection application server and a client component (not shown) residing on a client. A server component is configured to communicate with a client component during a backup process, an archive process, and a restore process.

One or more clients 110(1)-(N) are communicatively coupled to one or more data protection application servers 120(1)-(N) via a network 105. Data protection application servers 120(1)-(N) are coupled to storage servers 150(1)-(N). Storage servers provide access to coupled or attached storage devices, such as storage devices 160(1)-(N). Each data protection application server 120 also includes an analysis engine 130 and a discovery engine 140. A data protection application server and its components are further described in reference to FIG. 3A. A storage server is further described in reference to FIG. 3B.

While each data protection application server is illustrated as being coupled to a single storage server, each data protection application server can be coupled to multiple storage servers. Similarly, each storage server can be coupled to more than one data protection application server (and thus shared among the data protection application servers). A data protection application server can also be configured with the functionality of a storage server and can directly access one or more storage devices without an intervening storage server. While each storage server is illustrated as being coupled to a pair of storage devices, each storage server (if implemented in the storage system) can be coupled to one or to multiple storage devices. The storage devices can also be coupled to more than one (and thus shared among) storage server and/or data protection application server.

The letter N is used to indicate a variable number of devices or components. For example, a variable number of clients, application servers, storage servers, and storage devices are implemented in the storage system. Although the letter N is used in describing a variable number of instances of each of these different devices and components, a repeated use of the letter N does not necessarily indicate that each device and component has a same number of N instances implemented in the storage system.

A client can be implemented using, for example, a desktop computer, a laptop computer, a workstation, a server, or the like. An example of such computing devices is described subsequently, in connection with FIG. 11. An example of network 105, which can be used by clients 110(1)-(N) to communicate with data protection application servers 120(1)-(N), is a local area network (LAN) utilizing Ethernet, IEEE 802.11x, or some other communications protocol. As will be appreciated, data protection application servers 110(1)-(N) can also be accessed by clients coupled directly thereto (not shown).

A storage device 160 can include a data volume such as a cluster shared volume. Storage devices 160 can be implemented as a single storage device or a collection of storage devices. Storage devices 160 can also be implemented as a storage area network, which couples remote storage devices to a server (e.g., storage server 150), such that the remote storage devices appear as locally-attached storage devices to the server's OS, for example.

In light of the present disclosure, it will be appreciated that storage devices 160 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, data protection storage system 100 and network 105 can include other components such as routers, firewalls and the like that are not germane to the discussion of the present network and will not be discussed further herein. It will also be appreciated that other configurations are possible. For example, clients 110(1)-(N) can be directly coupled to storage devices 160, data protection application server 120 can be used to implement both the server component of the data protection application and functionality of the storage server, and so on.

Figure 2:
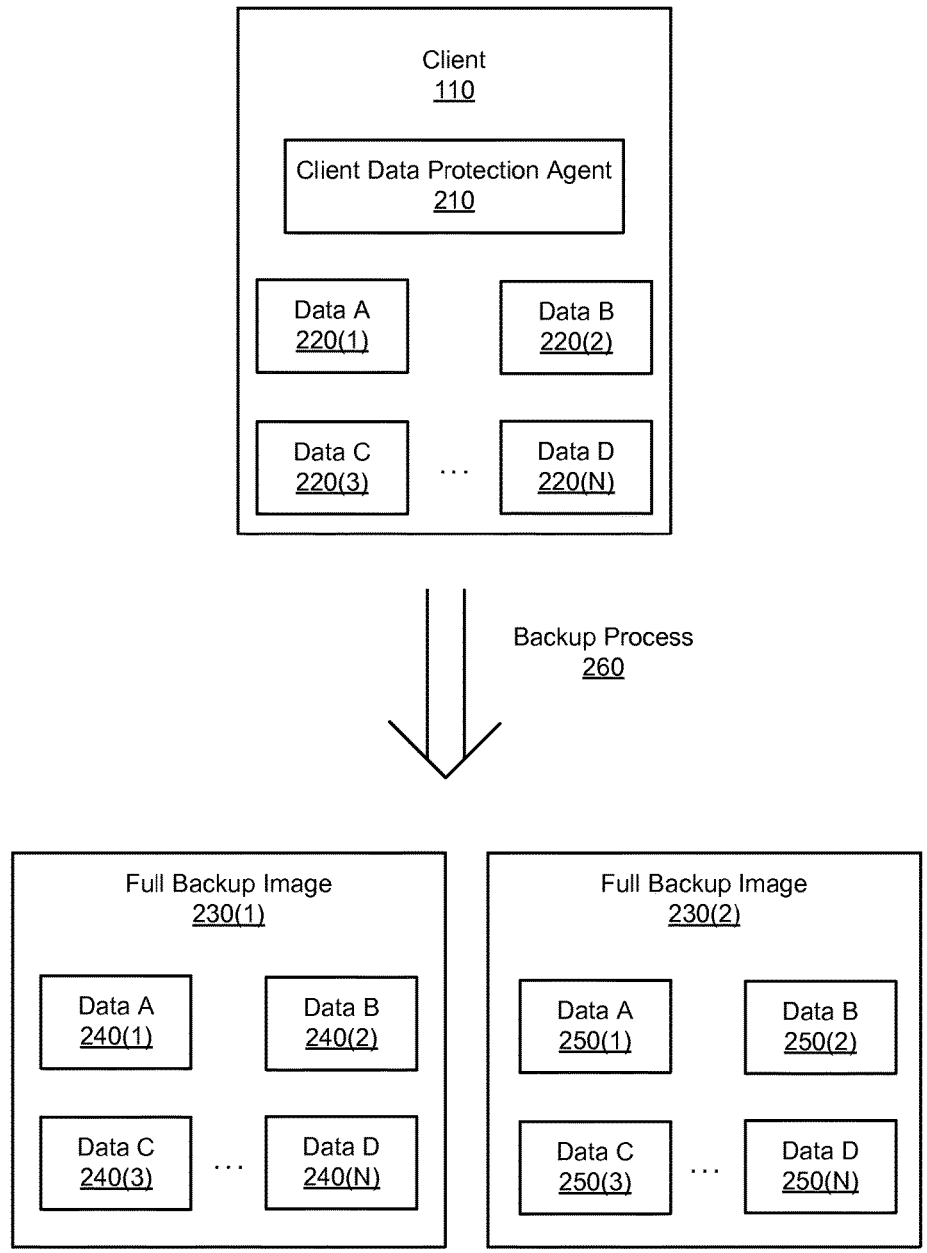
FIG. 2 is a block diagram illustrating relevant components of an example client, according to one embodiment.

FIG. 2 is a block diagram illustrating relevant components of an example client 110. Client 110 includes a client data protection agent 210, which is a client component of a data protection application implemented in the data protection storage system. A client can store client data, such as data A 220(1), data B 220(2), data C 220(3), and data D 220(N). Client data can include various files and directories, application data, database records, and the like.

In order for client 110 to be protected by a data protection application, a user can define a data protection policy for client 110 using a data protection application. Data protection policies can be stored on data protection application servers. A data protection policy is also referred to herein as a backup policy, an archive policy, or, more simply, a policy. A backup policy provides rules for backing up client data from a client 110, while an archive policy provides rules for archiving client data. Rules of a data protection policy are provided by information included in a policy, such as a client list of clients covered by the policy. Rules of a policy typically apply to all clients included in a client list of the policy. A client list of a policy can include only a single client or a group of clients that share backup or archive requirements. A client can also belong to multiple policies. Each client should be included in a client list of at least one backup policy in order to perform a backup process for the client.

A policy can also include a selection list, which provides a listing of client data, such as files, directories, database records, and the like, other that will be copied to a backup image or archive during a respective backup process and archive process. Such a policy also includes information regarding at least one schedule that indicates when a backup or archive process occurs. A schedule of a policy typically provides a window of time, such as a backup window or an archive window, during which a backup process or archive process can begin. More than one schedule can be included in a policy, and schedules can be periodic (e.g., repeating after a period of time has expired) or calendar-based (e.g., on a day of the week or month, or on specific dates). Schedules can provide different windows for automatic and user-initiated backup and archive processes, where windows for automatic backup and archive processes can be scheduled by the data protection application during off-peak hours to optimize network traffic or to avoid interference with normal operations of the client, while windows for user-initiated backup and archive processes can be scheduled during a different time that is convenient for a user. A policy can also provide dates and/or times that are excluded from the schedule, indicating a date and/or time during which a backup or archive process should not occur. A schedule can also provide a retention time for the client data to be maintained in the storage system. For example, an archive can use a retention time of infinite. For backups, a schedule for a backup process can also indicate a frequency of how often the backup process should occur (e.g., twice a month or every week).

A policy can also indicate where a backup image or an archive should be saved. A backup image of client data can be stored in designated backup storage of the storage system, while an archive of client data can be stored in designated archive storage of the storage system. Client data of a backup image stored in a storage system can also be archived, where the client data of the backup image is transferred to archive storage and the client data of the backup image is deleted from backup storage, if the archive transfer is successful. The client data that is archived can be part of a backup image or can be an entire backup image.

For backups, a policy can also indicate whether a backup process to be performed should be a full or partial backup process. A full backup process creates a full backup image that includes all client data (e.g., files) specified in a backup selection list of a backup policy, regardless of when the client data was last modified or backed up. A full backup process can be performed on a periodic basis, according to the backup schedule, in order to maintain a recent and updated copy of the client data. A partial backup process can be performed on a shorter periodic basis between full backups, according to the backup schedule. A partial backup only includes client data that has changed since a last backup (such as a last full backup or a last partial backup) was performed. The changed client data is copied or backed up to a partial backup image, such as an incremental or differential backup image. A full backup and a partial backup can be automatically initiated by a data protection application (according to a schedule provided in a backup policy) or initiated by a user.

Using a backup process as an example, a user can select all or some of client data stored on client 110 to be included in a backup selection list of a backup policy. In this first example, a user has included client data 220 (data A, B, C, and D) of FIG. 2 in a backup selection list of a backup policy for a full backup. Backup process 260 has produced two full backup images according to the policy: recent full backup image 230(1) and last full backup image 230(2), which was created at a time before full backup image 230(1). Both full backup images include a copy of client data, data 240 and data 250, respectively, and are stored in the storage system.

If client data 220 has not changed since the last full backup image 230(2), then client data 240 contained in recent full backup image 230(1) and client data 250 contained in last full backup image 230(2) are both instances of the same client data 220. Since client data stored on the storage system is a copy of client data stored on a client, instances of the client data stored on the storage system can be characterized as duplicate copies of the client data. Thus, the storage system is unnecessarily occupied by a large amount of duplicate copies of client data. If multiple full backups are stored, each with an unchanged copy of the same client data, then the inefficiency of the storage system is magnified.

In a similar example, client data 220 is duplicated within a single backup image. In this second example, a backup policy can provide that client application data should be backed up for a number of client applications on a client. If the client applications share a common set of files, the common set of files may be copied to the backup image multiple times—once for each client application. Client data A, B, C, and D 240 in recent full backup image 230(1) may each be a copy of such a common set of files that were backed up for four different client applications. Thus, storage resources of a storage system may be unnecessarily consumed by a large amount of duplicate copies of client data, which reduces available storage space (e.g., for other backup images of the client or other clients). The use of storage system resources of a storage system (such as that described in the last two examples) can be analyzed for efficiency by an analysis engine and a discovery engine, which are further described in reference to FIG. 3A.

Figure 3A:
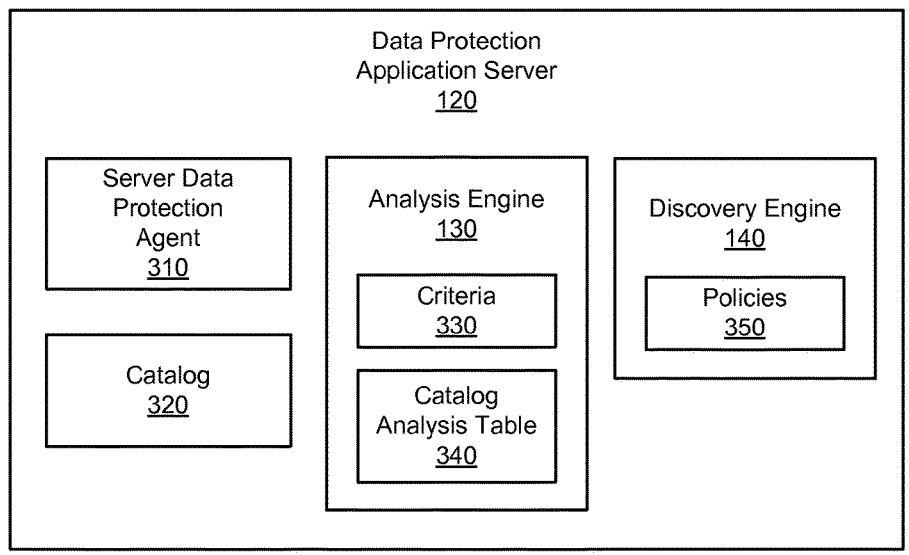
FIG. 3A is a block diagram illustrating relevant components of an example data protection application server, according to one embodiment.

FIG. 3A is a block diagram illustrating relevant components of an example data protection application server 120. Data protection application server 120 includes a server data protection agent 310, which is a server component of a data protection application implemented in the data protection storage system. Server data protection agent is configured to communicate with a client data protection agent during a backup process and an archive process (as well as during a restore process). Certain functions of the data protection application can be performed by the client and server data protection agents, where the functions may be divided between the two agents, or may be performed completely by one agent or the other, depending on the implementation of the data protection application.

Data protection application server 120 (via server data protection agent 310) is responsible for coordinating the creation and storage of backup images and archives for client data. A data protection application server receives client data from a client and transfers the client data to a storage device via a storage server (if implemented), where the client data is stored as a backup image or an archive. A backup process produces one or more backup images of client data, or multiple copies of client data. An archive process produces an archive of client data, or a single instance of client data. In certain implementations, the storage device selected to receive the client data can be specified in a policy for the client.

During a data protection process performed for a client, such as a backup process, a server data protection agent 310 stores information about a backup image in a catalog. A catalog is created or updated during a data protection process, such as a backup process. A catalog is a data store that contains information about all backup images created for a client according to a policy. Since a client can be configured with multiple policies, a catalog can be created for each policy. Thus, a data protection application can produce multiple catalogs, one for each client-policy combination. Every piece of client data, such as a file, contained in one or more backup images is catalogued by a data protection application in a catalog during creation of the one or more backup images. A catalog entry is created for every file contained in a backup image, even if that file is a duplicate of another file already catalogued in the catalog. For each file, a catalog includes a file path name of the file, a modification time of when the file was modified, and a user name and group name of an owner assigned to the file. A catalog can also include additional information about a file, such as an identification of a backup image in which the file is located, an identification of a storage device in which the backup image is located, and an identification of a policy by which the backup image was created. A file path name includes a file name and file extension (which indicates a file type) of the file. A catalog itself can also be backed up or archived. A catalog is further described in reference to FIG. 8.

Referring once again to FIG. 3A, data protection application server 120 includes an analysis engine 130 that performs an efficiency analysis of client data stored in one or more backup images in a storage system. This efficiency analysis is further described in reference to FIG. 4. An analysis engine can be implemented as a standalone component that communicates with a data protection application, such as a backup or archival application. An analysis engine can also be implemented as a plug-in for a data protection application. In both cases, a user interface can be provided to a user (either a user interface of the standalone analysis engine or of the data protection application). The user interface can provide a user with the ability to authorize deletion and archival of client data, via the functionality provided by the data protection application. For example, a user can view a report discussed below (in reference to FIG. 7) and can directly authorize deletion or archival of client data via a display of the user interface. The user interface communicates the user's instruction (e.g., delete or archive client data) to the data protection application, which performs or executes the user's instruction. An analysis engine can also be configured to automatically perform deletion or archival of client data without user intervention or instruction, where the analysis engine can automatically instruct the data protection application of the deletion or archival of client data.

Data protection application server 120 also includes a discovery engine 140, which analyzes policies configured for a client and determines whether the policies can be more efficiently implemented. Referring once again to FIG. 2, as a third example, full backup images 230(1) and 230(2) are provided according to two different backup policies. In such an example, both backup policies cover client data 220, and thus full backup images 230(1) and 230(2) each contain an instance of client data, as data 240 and 250, respectively. Such double coverage of client data 220 results in storage resources being unnecessarily occupied by a large amount of duplicate copies of client data, reducing available storage space for other backup images of the client or other clients.

Discovery engine 140 accesses policies 350 for a client, where the policies are stored on a data protection application server. If a client is configured to use more than one data protection application server, policies covering the client can be stored on those different data protection application servers. Discovery engine 140 can communicate with the other data protection application servers in order to access all policies covering the client. Discovery engine can also store a copy of such policies locally. Discovery engine 140 compares the policies associated with a client and determines whether client data is being unnecessarily duplicated because two or more policies cover the client data. For example, two policies may both back up client data 220, or a backup policy may back up client data that is already covered by an archive policy. Discovery engine 140 identifies a set of policies that provide double coverage of client data and sends a notice of the double coverage to a user of the client. For example, discovery engine can compare selection lists of two or more policies to determine client data included in more than one policy. Discovery engine 140 can compare policies for a single client, or for multiple clients. Discovery engine 140 can also notify a user of possible storage savings if the set of policies in issue were changed to eliminate all or part of the double coverage of client data.

Once the double coverage policies have been identified, the policies can be presented to a user in a report to illustrate different aspects of the policies. One example report can provide graphical illustrations (e.g., a Venn diagram) that indicate overlap of policies, where the overlap indicates client data that is covered by two or more policies. Another example report can provide a graphical listing or display of the entries of at least one catalog analysis table for each client, indicating the policies that cover client data of the client. For example, a report can display an entry listing including a client name, two or more policy names for policies that cover a common portion of client data, and a common data size of the common portion of client data.

A discovery engine can be implemented as a standalone component that communicates with a data protection application, such as a backup or archival application. A discovery engine can also be implemented as a plug-in for a data protection application. In both cases, results of a double coverage analysis performed by a discovery engine can be provided in a user interface (either a user interface of the standalone discovery engine or of the data protection application). Further, the user interface can provide a user with the ability to access and to modify policies, via the functionality provided by the data protection application. For example, a user can view one of the reports discussed above in the user interface and can directly change the policies (e.g., modify a selection list of a policy) via a display of the user interface. The user interface communicates the user's policy changes to the data protection application, which performs or executes the user's policy changes.

Figure 3B:
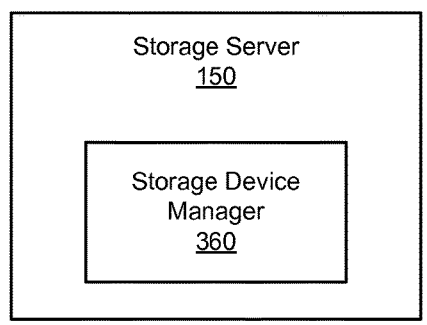
FIG. 3B is a block diagram illustrating relevant components of an example storage server, according to one embodiment.

FIG. 3B is a block diagram illustrating relevant components of an example storage server 150. A storage server manages one or more storage devices via storage device manager 360. Storage device manager 360 is illustrated as residing on a storage server that is separate from a data protection application server. In another embodiment, storage device manager can reside on a data protection application server, allowing the data protection application server to manage one or more storage devices via storage device manager 360. Storage device manager 360 is directed by a data protection application server to store a backup image and/or archive data from a client to a storage device, according to a backup policy for the client. Storage device manager transfers the backup image and/or archive data to an attached storage device. Storage servers help distribute the network load during storage of backup images and/or archive data, thereby increasing performance of the storage system.

Figure 4:
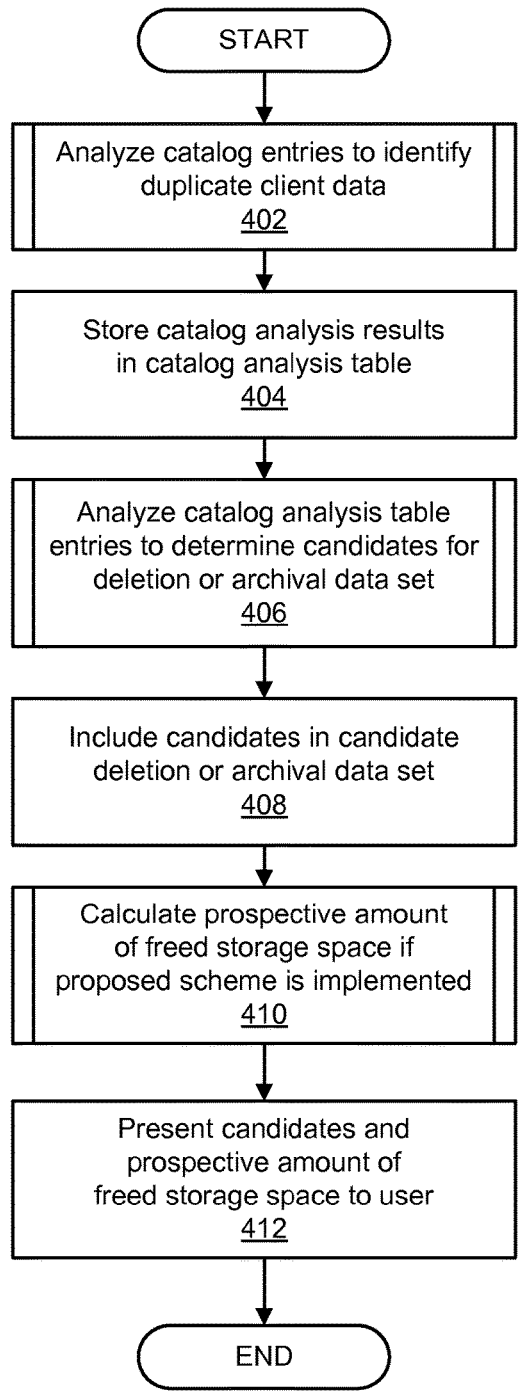
FIG. 4 is a flow chart illustrating relevant acts of an example efficiency analysis process implemented by a data protection application server, according to one embodiment.

FIG. 4 is a flow chart illustrating relevant acts of an example efficiency analysis process performed by an analysis engine implemented by a data protection application server. The efficiency analysis process begins at step 402, performing a catalog analysis of catalog entries of a catalog. The catalog entries are associated with the client data because each catalog entry contains information about a file of the client data. A catalog analysis, among other potential operations, identifies duplicate copies of client data using information of the catalog entries. The efficiency analysis process continues to step 404, storing results of the catalog analysis in a catalog analysis table. The catalog analysis is further described in reference to FIGS. 5A-5C.

Alternatively, the catalog analysis can be performed on a catalog of live client data located in a client system. Live client data is client data that has not been backed up on a storage system. Such a catalog of live client data can be created by performing a cataloguing process on a client, where information about live client data is stored in the live client catalog in a same manner as information about backed up client data is stored in a backup catalog. Cataloguing live client data can also be considered a data protection process. The live client catalog can be analyzed by the catalog analysis in a same manner as a backup catalog. Results of such a catalog analysis (whether performed on a backup catalog or a live client catalog) are stored in catalog analysis table.

The efficiency analysis process continues to step 406, performing a table analysis of table entries of a catalog analysis table. The table entries are associated with the client data because the table entries contain information about duplicate copies of client data. The table analysis analyzes the table entries to determine candidate client data that can be deleted or archived, according to criteria. Criteria can be received from a user and includes attributes of client data. The attributes of the criteria are used to identify client data suitable for deletion, where such client data is included in a candidate deletion data set. The attributes of the criteria are also used to identify client data suitable for archival, where such client data is included in a candidate archival data set. Client data may meet both criteria for deletion and archival, and will be included in both the candidate deletion data set and the candidate archival data set. Criteria can also include attributes of client data that should be excluded from the table analysis. More than one catalog analysis table can be implemented, such as one catalog analysis table for each client-policy combination, or one catalog analysis table for a candidate deletion or archival data set. The table analysis can be performed on each implemented catalog analysis table.

The process continues to step 408, where client data possessing attributes that meet criteria are included in a candidate deletion data set or a candidate archival data set. For example, if a file of client data possesses attributes that meet criteria for deletion, the file will be included in the candidate deletion data set, such as by adding an identifier of the file to the candidate deletion data set. Similarly, if a file of client data possesses attributes that meet criteria for being archived, the file will be included in the candidate archival data set, such as by adding an identifier of the file to the candidate archival data set. The table analysis is further described in reference to FIG. 6.

The efficiency analysis process continues to step 410, calculating a prospective amount of freed storage space. A prospective amount of freed storage space indicates storage space that will no longer be needed to store the candidate client data (if the candidate client data is deleted or archived), and can be reclaimed by the storage system if some or all of the candidate client data is deleted or archived. The candidate deletion and archival data sets determined in step 406 are part of a proposed storage scheme to reduce client data stored in the storage system, and thus improve efficient use of storage resources in the storage system. A proposed storage scheme identifies candidate client data that can be deleted or archived by classifying such candidate client data into one of a candidate deletion data set and a candidate archival data set. A candidate deletion data set includes client data suitable for deletion. The candidate deletion data set can include client data that has reached an expiration or retention date (e.g., a file of client data that has reached an expiration date, client data contained in an expired backup image or archive, or the entire expired backup image or archive). A candidate archival data set includes client data suitable for archival.

An optimization process to reduce client data is also provided below. Client data can be de-duplicated to eliminate duplicate copies of client data while maintaining a master copy of client data. Client data suitable for de-duplication can be included in a storage optimization data set. The storage optimization data set is also part of the proposed storage scheme.

A prospective amount of freed storage can be calculated at step 410, depending on how much of the proposed scheme is implemented. In other words, the prospective amount of freed storage depends on whether some or all of the client data in the candidate deletion data set is deleted, whether some or all of the client data in the candidate archival data sets is archived, and/or whether some or all of the client data in the storage optimization data set is de-duplicated. This storage calculation process is further described in reference to FIG. 7.

The efficiency analysis process continues to step 412, presenting results of the efficiency analysis and storage calculations. Candidate client data can also be presented, such as in a display or listing of files included in the candidate deletion and archival data sets. A listing of unique data of the client data in the candidate deletion and archival data sets can also be displayed. The results of the efficiency analysis and storage calculations, as well as a listing of candidate client data, can be presented to a user in a user interface on a display coupled to a client. A user interface can be implemented as discussed above. An analysis engine communicates with the data protection application to provide information that will be presented in the user interface (e.g., analysis results and candidate client data). A user can authorize deletion of some or all of the candidate deletion data set, and can authorize archival of some or all of the candidate archive data set. User authorization can be manually implemented using the user interface, and the candidate client data can be deleted and/or archived by the data protection application in response to the user's authorization. User authorization can also be provided prior to performance of an efficiency analysis, allowing for an analysis engine to automatically delete and/or archive client data via the data protection application.

Client data that is authorized for deletion can be deleted from the storage system or from the client system. Client data that is authorized for archival can be archived (and thus also removed) from the storage system (e.g., moved from backup storage to archive storage) or from the client system. During an archival process, duplicate copies of archived client data on the storage system or client system can also be deleted, resulting in a single instance of the client data in archival storage. Once candidate client data has been deleted or archived, the catalog analysis table is updated to reflect that the candidate client data is no longer occupying storage in the storage system or client system. A user can also use the information presented in the user interface to identify candidate client data located on the client. Client data can be automatically deleted or archived or manually deleted by a user via the user interface (by instructing the data protection application to delete or archive the client data via a delete or archive command from the user interface).

Since a data protection application continues to create backup images for a client on a storage system, the storage system will continue to store new duplicate copies of client data. With each new backup image containing additional duplicate client data, the use of storage resources in the storage system becomes more inefficient. Thus, the efficiency analysis should be performed periodically in order to identify new instances of duplicate copies of client data.

Similarly, the optimization process should also be performed periodically to eliminate new instances of duplicate copies of client data.

Figure 5A:
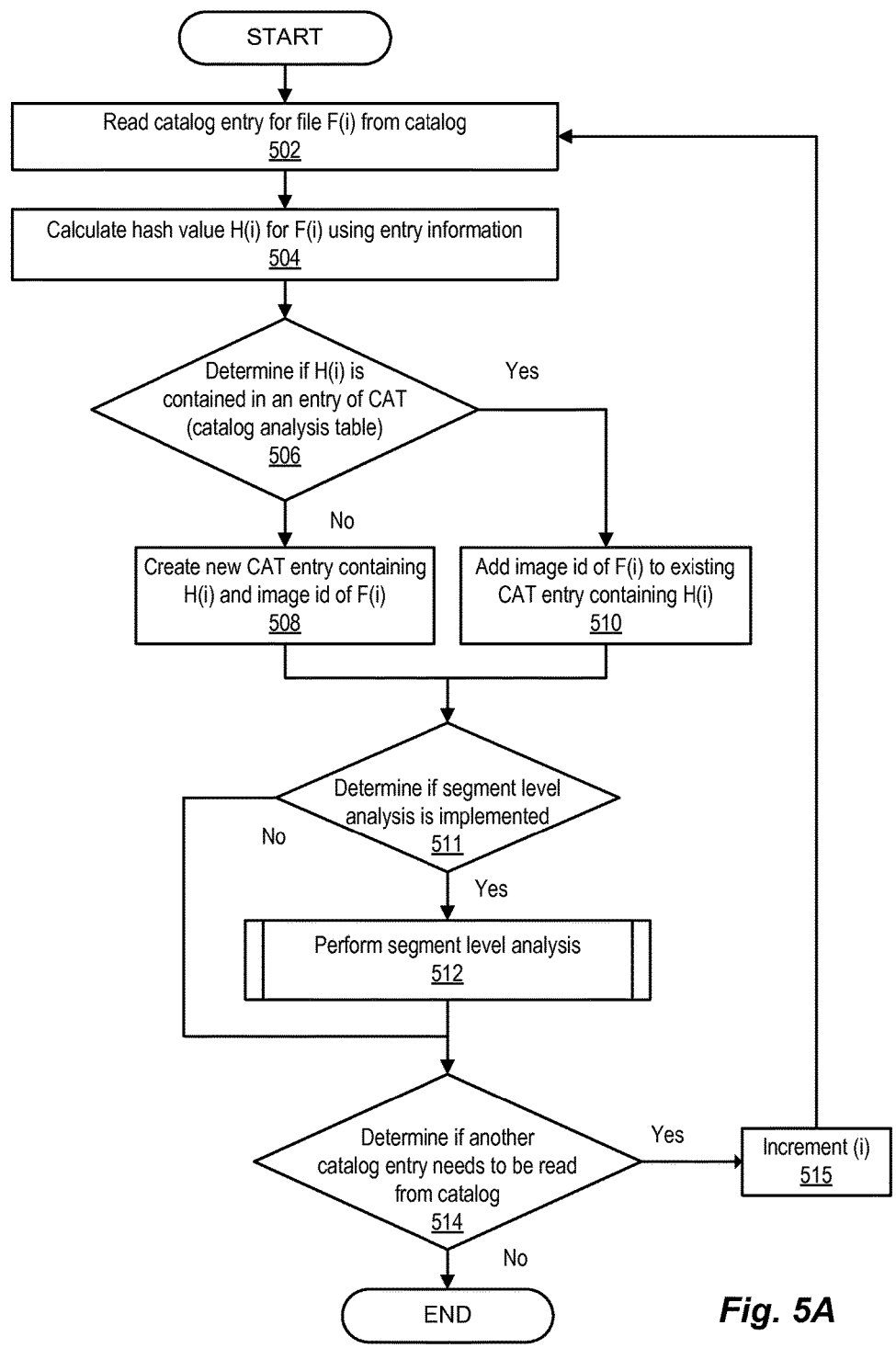
FIG. 5A is a flow chart illustrating relevant acts of an example catalog analysis process implemented by a data protection application server, according to one embodiment.

FIG. 5A is a flow chart illustrating relevant acts of an example catalog analysis process performed by an analysis engine implemented by a data protection application server. The catalog analysis process can identify duplicate copies of client data in the form of files in a catalog analysis table. The catalog analysis table is discussed in reference to FIG. 9A.

The catalog analysis process of FIG. 5A begins at step 502, reading a catalog entry for a file from a catalog. Since the catalog analysis process is a reiterative process that is performed for each catalog entry in a catalog, a present iteration of the process is indicated by the letter i. At the end of each iteration, the letter i is incremented, indicating that the next catalog entry is to be read. Thus, step 502 begins reading a catalog entry for a present file F(i).

The catalog analysis process continues to step 504, calculating a present hash value H(i) for the present file F(i). The hash value is generated using information included in the catalog entry for the present file F(i), and is used to identify files. For example, a file path name, a modification time, a user name, and a group name of the catalog entry for a file can be hashed with a hashing function to generate a hash value for the file. As the catalog analysis process iterates, a hash value H is calculated for every entry of the catalog. If two or more catalog entries contain the same information (and thus identify multiple (duplicate) instances of a single file), a hash value calculated for the entries will be the same (i.e., H(i) for catalog entry (i) will be the same value as H(i+1) for catalog entry (i+1), if catalog entries (i) and (i+1) identify instances of the same file).

Once a present hash value H(i) is calculated, the catalog analysis process continues to step 506, determining whether hash value H(i) is contained in an entry of a catalog analysis table. A catalog analysis table is populated as a catalog analysis is performed by an analysis engine, where the results of the catalog analysis are stored in the catalog analysis table. A catalog analysis can be performed on multiple catalogs associated with a client, where each catalog is created for a client-policy combination. In one embodiment, a catalog analysis can also be performed on multiple catalogs associated with multiple clients. Such a catalog analysis can be useful if duplicate client data is being stored in backup images of multiple clients.

A catalog analysis table entry is created for every first instance of a file found during the catalog analysis process, for a client and policy combination. A catalog analysis table entry includes information about multiple instances of a file that are located throughout one or more backup images. Every entry in a catalog analysis table includes a client name of the client from which a file instance originated and a policy name of the policy covering the backup of the file instance. A catalog analysis table also includes a data hash value for the file instance. A client name, policy name, and data hash together form a primary key for the catalog analysis table. A catalog analysis table entry can also include a data size of a file. Optionally, a file name of the file can also be included in an entry.

Once an entry for a first instance of a file has been added to the catalog analysis table, information about subsequently found instances of the file is also included in the same catalog analysis table entry, where the subsequent instances share the same client and policy combination. Thus, a single catalog analysis table entry can indicate all instance(s) of a file, for a client and policy combination.

A catalog analysis table entry also includes an image identification (ID) list, which is configured to contain multiple values. Image ID list contains an identification of a backup image containing an instance of a file of the catalog analysis table entry. If an instance of a file is located in multiple backup images, an identification (image ID) of each of those backup images are entered into the image ID list. If an instance of a file is located in two or more locations of the same backup image, the backup image is identified twice in the image ID list, either as the same image ID that is entered twice into the image ID list (i.e., duplicate image IDs), or as different instances of the image ID (i.e., backup_image_1 (1), backup_image_1(2), etc). Alternatively, an image ID can provide an identification of a location of an instance of client data that is not necessarily a backup image containing the instance. For example, an instance of a file can be located in multiple locations in live client data, but the instances are not contained in a backup image that can be identified. Locations can be identified by, for example, a disk drive identification (e.g., a disk drive of a client system), a name of a file directory, an identification of a physical location on the client system (e.g., a local storage device in the client system or disk sector of a disk drive), an address (e.g., a virtual or physical memory address), and the like. Thus, each instance of a file is represented by an image ID in the image ID list for the file.

If an instance of a file is deleted or archived, the catalog analysis table entry for the file is updated to reflect that the particular instance is no longer occupying storage in the storage system by removing the image ID of the (now deleted or archived) file instance from the image ID list of the entry. If the particular instance is a single instance of a file (and thus the entry for the file only has one image ID in the image ID list), the entire entry can be removed from the catalog analysis table.

Referring once again to FIG. 5A, if the present hash value H(i) is not contained in an entry of a catalog analysis table (CAT), the process continues to step 508, creating a new CAT entry for the file F(i). In other words, the hash value H(i) that is not contained in the CAT indicates that the file F(i) is a first instance of a file and should be entered into the CAT. The hash value H(i) is included in the new CAT entry for the file F(i). An image identification (ID) of the backup image in which file F(i) is contained is also included in the new CAT entry.

If the hash value H(i) is contained in an entry of the CAT, the process continues to step 510, adding the image ID of the backup image in which the present file F(i) is contained to the existing CAT entry. In other words, the hash value H(i) that is already contained in the CAT indicates that the file F(i) is a subsequent instance of a file and should be entered into the existing CAT entry for the file. This ensures that the existing CAT entry includes information for all instances of the file, wherever they may be located. Thus, steps 508 and 510 populate a catalog analysis table with information about every unique file contained in the one or more backup images.

From both steps 508 and 510, the catalog analysis process continues to step 511, determining if a segment level analysis is implemented. If yes, then the process continues to step 512, performing a segment level analysis. This segment level analysis is further discussed in reference to FIGS. 5B and 5C. If such a segment level analysis is not implemented, the process continues to step 514, determining if another catalog entry needs to be read from the catalog. If another entry needs to be read, i is incremented in step 515 and the process of FIG. 5A reiterates, returning to step 502 to read the next catalog entry. If no other entry needs to be read, the process of FIG. 5A ends.

Figure 5B:
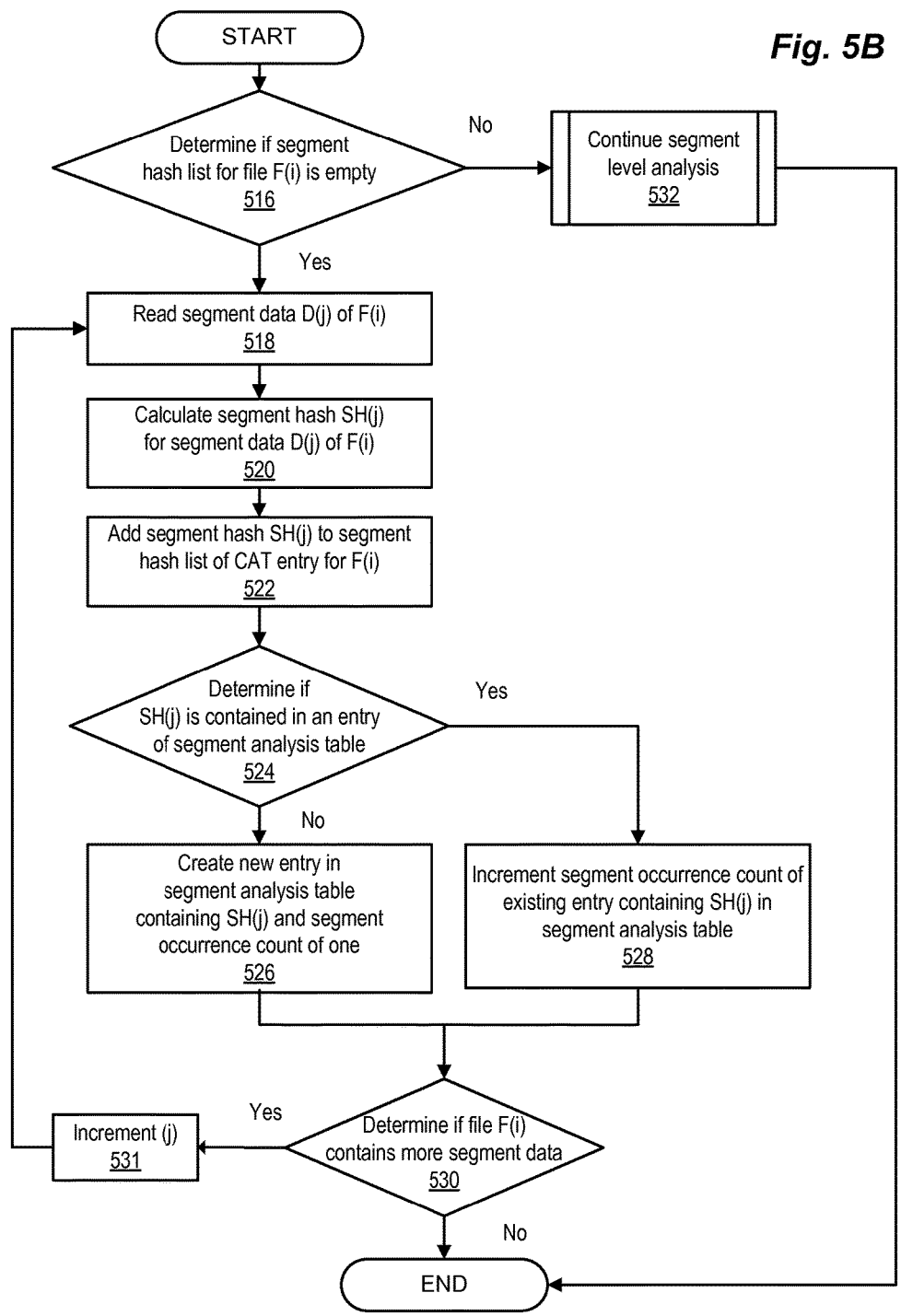
FIGS. 5B and 5C are flow charts illustrating relevant acts of an example segment level analysis process that can be further implemented in the example catalog analysis process of FIG. 5A, according to one embodiment.
Figure 5C:
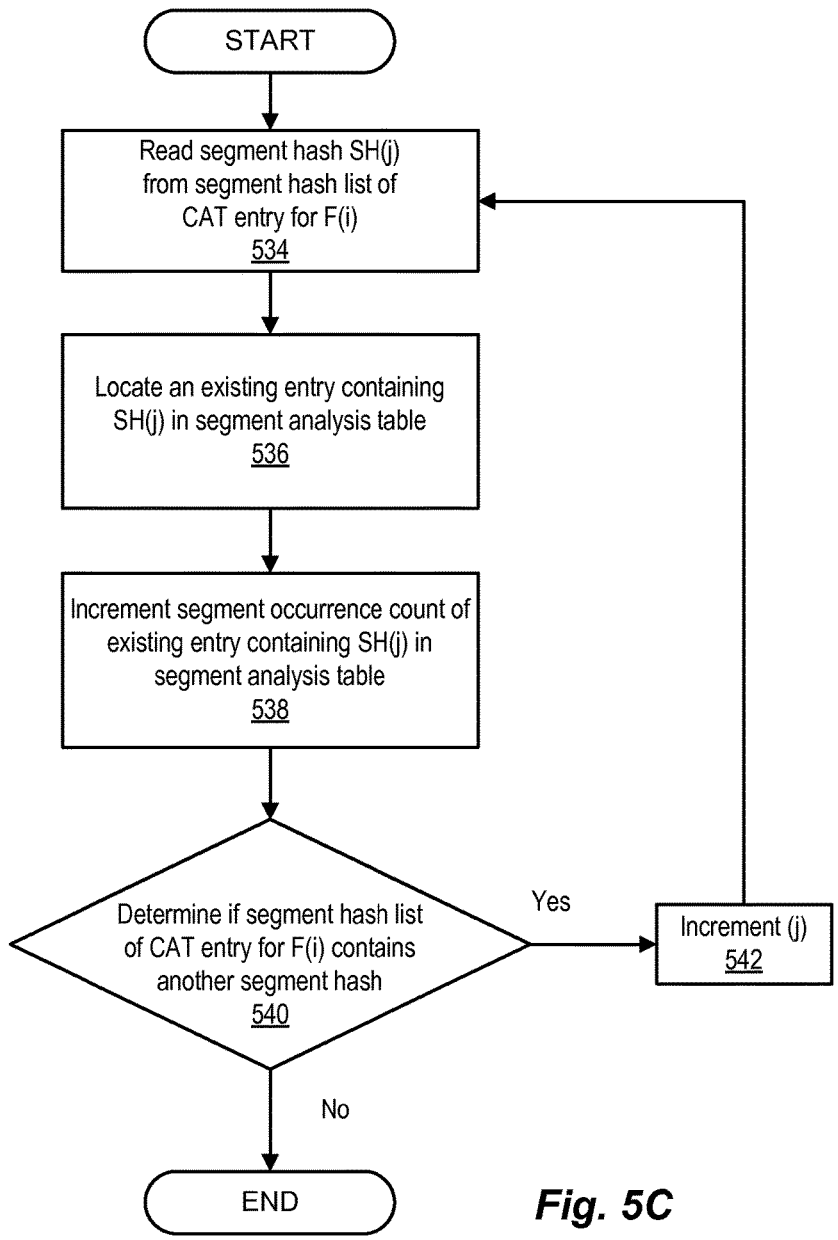

FIGS. 5B and 5C are flow charts illustrating relevant acts of an example segment level analysis process that can be further implemented in the catalog analysis process of FIG. 5A. While the catalog analysis process of FIG. 5A can identify duplicate copies of client data in the form of files, a segment level analysis provides a finer level of granularity by dividing a file into file segments, or, simply, segments. If a segment level analysis process is implemented in the catalog analysis process described above, an alternative catalog analysis table and a segment analysis table are used, where the catalog analysis process of FIG. 5A populates the alternative catalog analysis table in a same manner as described above. An alternative catalog analysis table contains the same information as a catalog analysis table, with the addition of a segment hash list. A segment hash list contains segment hash values for all segments contained in a file. A segment hash value is generated from hashing a segment itself and is used to identify file segments. An alternative catalog analysis table is discussed in reference to FIG. 9B, and a segment analysis table is discussed in reference to FIG. 10.

Referring to FIG. 5B, the segment level analysis process begins at step 516. At step 516, a catalog analysis table (CAT) entry for a present file F(i) has either been created for a first instance of a file (by step 508) or updated to include information for a subsequent instance of a file (by step 510). In both cases, the CAT entry for the present file F(i) now contains a present hash value H(i) for the file F(i). Step 516 determines whether the catalog analysis table entry that contains the present hash value H(i) also contains an empty segment hash list. An empty segment hash list of a catalog analysis table entry indicates that the file F(i) has not previously undergone segment level analysis. In other words, an empty segment hash list indicates that the file F(i) is a first instance of a file and the segments of the file have not yet been hashed.

If a segment hash list of the CAT entry is empty, the process continues to step 518, reading segment data D(j) from file F(i). Since the segment level analysis is a reiterative process that is performed for each segment of the file, a present iteration of the process is indicated by the letter j. At the end of each iteration, the letter j is incremented, indicating that the next segment is to be read. The letter j is used in separate iterations in FIGS. 5B and 5C. Thus, step 518 begins reading present segment data D(j) from file F(i).

The segment level analysis process continues to step 520, calculating a present segment hash SH(j) for segment data D(j). The segment hash value is generated from segment data D(j) of the file segment by hashing the segment data D(j). As the segment level analysis of FIG. 5B iterates, a segment hash value SH is calculated for every segment of the file F(i). If two or more segments have the same segment data (and thus are multiple (duplicate) instances of a single segment), a segment hash value calculated for the segments will be the same. Once a present segment hash SH(j) is calculated, the process continues to step 522, adding the segment hash SH(j) to the segment hash list of the CAT entry for file F(i). The segment hash list can include multiple segment hash values, as well as duplicate segment hash values.

The segment level analysis process continues to step 524, determining whether segment hash SH(j) is contained in an entry of a segment analysis table. A segment analysis table is populated as the segment level analysis is performed by an analysis engine, where the results of the segment level analysis are stored in the segment analysis table. A segment level analysis can be performed on files that are being analyzed during a catalog analysis. A segment analysis table entry is created for every first instance of a segment found in a file of one or more backup images, for a client and policy combination. Every entry in a segment analysis table includes a client name of the client from which a file segment originated and a policy name of the policy covering the backup of the file of the file segment. Segment analysis table also includes a segment hash value for the file segment. Client name, policy name, and segment hash value together form a primary key for the segment analysis table. Once an entry for a first instance of a segment has been added to the segment analysis table, information about subsequently found instances of the segment is also included in the same segment analysis table entry, where the subsequent instances share the same client and policy combination. Thus, a single segment analysis table entry can indicate all instance(s) of a file segment, for a client and policy combination.

A segment analysis table entry also includes a segment size of a file segment. Segments can contain an amount of data of a predetermined block size, or can contain an amount of data of variable block size. A segment analysis table entry can also include a segment occurrence count. On creation of a segment analysis table entry for a first instance of a file segment, segment occurrence count of the entry is set to one. For each subsequent instance of the file segment that is added to the entry, the segment occurrence count of the entry is incremented by one. Thus, segment occurrence count indicates the number of instances of the file segment.

If, for some reason, the segment data of a file segment is unavailable for the segment level analysis to be performed, a segment hash value cannot be generated from the segment data. Thus, instances of unavailable segment data cannot be included in the segment analysis table. In such a scenario, the alternative catalog analysis table of can also include a segment availability column containing a Boolean value that indicates whether the segment hash value of an entry is generated from segment data or from other information. If set (i.e., a value of 1), the segment data is unavailable and not included in the segment level analysis and are not accounted for in the segment analysis table. If not set (i.e., a value of 0), the segment data is available, the segment analysis has been performed on the segment data, and the segment data has been accounted for in the segment analysis table.

If a file is deleted or archived, the segment analysis table entries for file segments of the file are updated to reflect that the file (and thus its file segments) is no longer occupying storage in the storage system. If a particular segment is one of multiple instances of a file segment, the segment occurrence count for the segment can be decremented. If the particular segment is a single instance of a file segment (and thus the segment occurrence count in the entry is one), the entire entry can be removed from the segment analysis table.

Referring once again to FIG. 5B, if the segment hash SH(j) is not contained in an entry of a segment analysis table, the process continues to step 526, creating a new entry for the segment D(j) in the segment analysis table. In other words, the segment hash value SH(j) that is not contained in the segment analysis table indicates that the segment is a first instance of a segment and should be entered into the segment analysis table. The segment hash value SH(j) is included in the new entry for segment D(j). A segment occurrence count included in the entry is also set to one, indicating that only one occurrence or instance of the segment has been found.

If the segment hash value SH(j) is contained in an entry of the segment analysis table, the process continues to step 528, incrementing a segment occurrence count of the existing entry to indicate another occurrence or instance of the segment has been located. In other words, the segment hash value SH(j) that is already contained in the segment analysis table indicates that the segment is a subsequent instance of a file segment and should be entered into the segment analysis table entry for the file segment. This ensures that the existing segment analysis table entry includes information for all instance(s) of the segment, wherever they may be located. Thus, steps 526 and 528 populate a segment analysis table with information about every unique file segment located in the files of the one or more backup images.

From both steps 526 and 528, the segment level analysis process continues to step 530, which determines if another file segment needs to be read from the file F(i). If another segment needs to be read, j is incremented in step 531 and the process of FIG. 5B reiterates, returning to step 518 to read the next segment. If no other segment needs to be read, the process ends.

Referring once again to step 516 of FIG. 5B, if the segment hash list of the CAT entry is not empty, the process continues to step 532, which provides for additional segment level analysis illustrated in FIG. 5C. A non-empty segment hash list of a catalog analysis table entry indicates that the file has previously undergone segment level analysis. In other words, file F(i) is a subsequent instance of a file and the segments of the file have already been hashed. The segment level analysis process of FIG. 5B continues to FIG. 5C

FIG. 5C illustrates a continuation of the segment level analysis process, and begins at step 534, reading a present segment hash SH(j) from the segment hash list. The process continues to step 536, locating the present segment hash SH(j) in a segment analysis table. Since the file has already undergone segment level analysis, the segments of the file have previously been hashed and the resulting segment hash values have previously been entered into the segment analysis table. Step 536 locates an existing segment analysis table entry that contains the present segment hash SH(j). The process continues to step 538, incrementing a segment occurrence count of the existing entry to indicate that another occurrence or instance of the segment has been located. The process continues to step 540, determining if another segment hash value needs to be read from the segment hash list. If another segment hash value needs to be read, j is incremented and the process of FIG. 5C reiterates in step 542, returning to step 534 to read the next segment hash value. If no other segment needs to be read, the process of FIG. 5C ends and returns to the process of FIG. 5B, which also ends.

Figure 6:
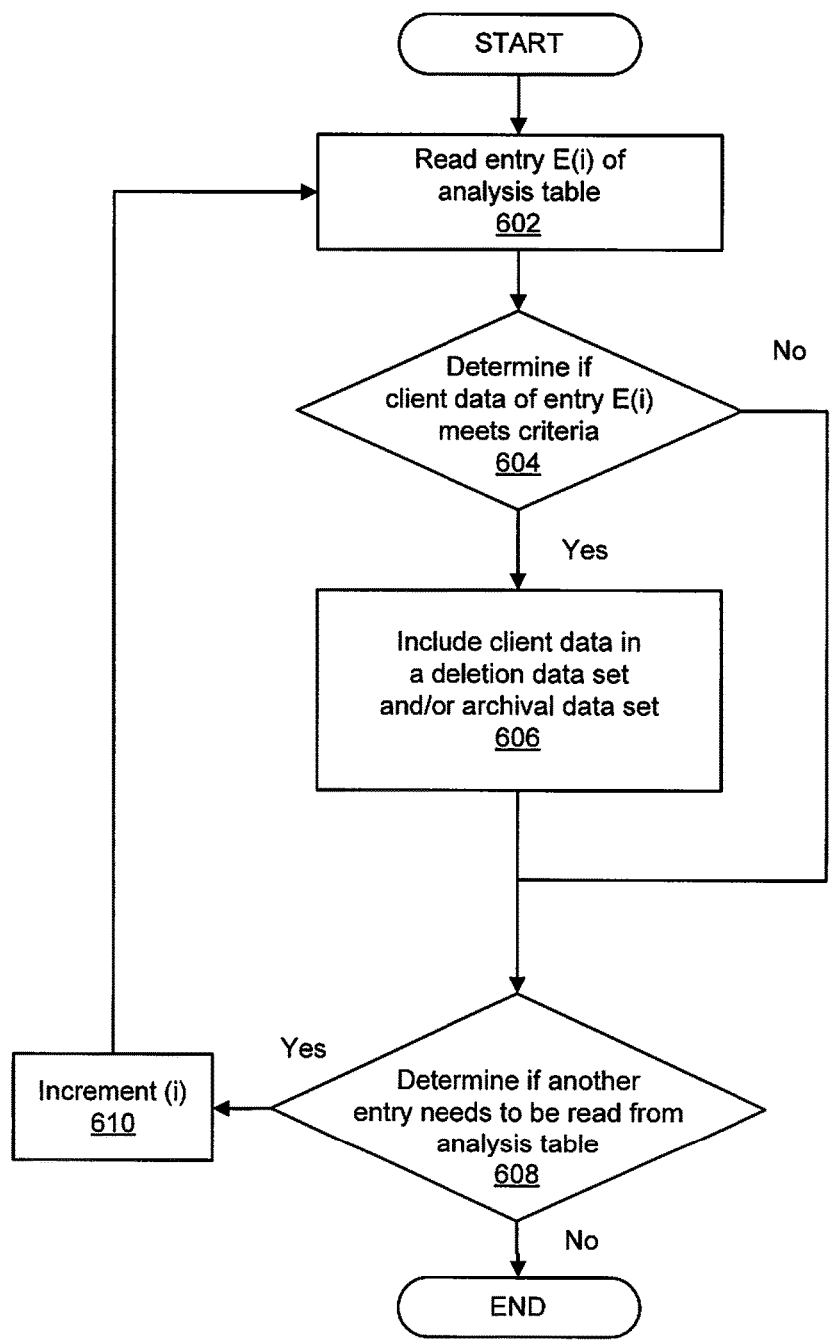
FIG. 6 is a flow chart illustrating relevant acts of an example table analysis process implemented by a data protection application server, according to one embodiment.

FIG. 6 is a flow chart illustrating relevant acts of an example table analysis process performed by an analysis engine implemented by a data protection application server. Once catalog analysis table 340 of FIG. 9A has been populated by catalog analysis process of FIG. 5A, the catalog analysis table can be analyzed according to the table analysis process. If segment level analysis has been implemented, the table analysis process is alternatively performed on catalog analysis table 340 of FIG. 9B.

The table analysis process begins at step 602, reading a present entry E(i) of catalog analysis table. As similarly stated above, the letter i indicates a present iteration of the table analysis process of FIG. 6. The process continues to step 604, determining if a file identified in entry E(i) meets criteria. As discussed above, a catalog analysis table entry contains information about all instances of a file. Criteria can be pre-defined by the data protection application or can be defined by a user. Criteria includes attributes of client data that are used to identify candidate client data. For example, deletion criteria identifies target file attributes of files that are suitable for deletion, while archival criteria identifies target file attributes of files that are suitable for archival. Example file attributes of criteria include, but are not limited to, a modification date of a file (e.g., files last modified over 10 years ago or within a period of time), data size of a file (e.g., files larger than 5 MB), owner of a file (e.g., files created and maintained by a particular user or group of users), a file type (e.g., word processing documents or database records), keywords (e.g., a keyword in the file name of the file), and the like. Such file attributes can be stored in a catalog analysis table, in a catalog, or in a file itself. A file may meet criteria for both deletion and archival.

Criteria can also indicate files that should be excluded from the table analysis. Criteria for exclusion can include file attributes that identify files that should be excluded from the table analysis. A file that possesses file attributes that match the excluded file attributes of the criteria does not meet the criteria, and thus is excluded from the table analysis. The files that do not meet the exclusion criteria (and thus are included in the table analysis) can be identified in a third data set, or a complete analysis data set. The complete analysis data set is a superset that includes the candidate deletion data set and the candidate archival data set. Each entry in a catalog analysis table will correspond to one or more of the candidate deletion data set, the candidate archival data set, and the complete analysis data set.

A file identified in entry E(i) is considered to meet the criteria if file attributes of the file match the target file attributes of the deletion or archival criteria and do not match the file attributes of the exclusion criteria. For example, a file identified in entry E(i) can possess file attributes that match deletion criteria and do not match the exclusion criteria. The same file can also possess file attributes that match archival criteria and do not match the exclusion criteria. If the file identified in entry E(i) meets the deletion or the archival criteria and does not meet the exclusion criteria, the process continues to step 606, where the file is included in a candidate deletion data set (if the file meets deletion criteria) or to a candidate archival data set (if the file meets archival criteria). In this example, a file can meet both deletion and archival criteria (e.g., a file that is 20 years old can meet deletion criteria of files older than 10 years and archival criteria of files older than 15 years), and thus can be included in both a candidate deletion and archival data set.

In one embodiment, a candidate deletion data set and a candidate archival data set can each be an association of files. In one embodiment, a candidate deletion and archival data set can each be a data store configured to store identifying information that identifies candidate files and instances of candidate files. Identifying information can include one of an identifier of a file (e.g., a file name), an identifier of an instance of a file (e.g., an image ID representing an instance of a file), an identifier of a catalog analysis entry containing information about a file, or a copy of information contained in the catalog analysis table entry for a file. Each candidate file can be identified in an entry of a candidate deletion or archival data set, with multiple instances of the candidate file being included in the same entry, in an entry structure similar to that of a catalog analysis table of FIG. 9A. The table analysis process then continues to step 608.

Returning to step 604, if the file identified in entry E(i) does not meet the criteria, the table analysis process also continues to step 608. Step 608 determines if another entry needs to be read from the catalog analysis table. If another entry needs to be read, i is incremented in step 610 and the process of FIG. 6 reiterates, returning to step 602 to read the next entry of the catalog analysis table. If no other entry needs to be read, the process of FIG. 6 ends.

Figure 7:
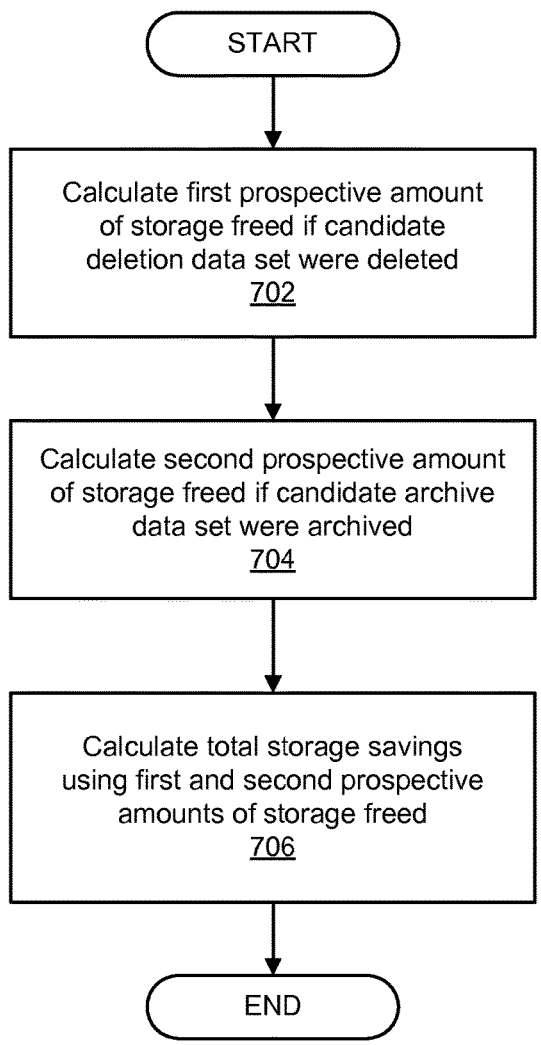
FIG. 7 is a flow chart illustrating relevant acts of an example storage calculation process implemented by a data protection application server, according to one embodiment.

FIG. 7 is a flow chart illustrating relevant acts of an example storage calculation process performed by an analysis engine implemented by a data protection application server. While the discussion below describes using information from a single catalog analysis table or a single segment analysis table, multiple catalog analysis tables and multiple segment analysis tables may be used in the storage calculation process. For example, one file that is included in a candidate deletion data set can be described in an entry of one catalog analysis table, while another file that is included in the candidate deletion data set can be described in an entry of another catalog analysis table. In this example, both catalog analysis tables would be accessed during the storage calculation process for information used to calculate data sizes.

The storage calculation process begins at step 702, calculating a first prospective amount of storage that can be freed if the client data of the candidate deletion data set were deleted from the storage system. In one embodiment, if a file is included in both a candidate deletion data set and a candidate archival data set, and the candidate deletion data set is deleted, then the file is deleted and is no longer a candidate file in the candidate archival data set. Once a candidate deletion data set is deleted, the storage no longer occupied by the deleted client data is freed and can be reclaimed by the storage system for other purposes.

The first prospective amount of storage that can be freed upon deletion of the candidate deletion data set corresponds to a total deletion data size of the candidate deletion data set. The first prospective amount of storage can be more or less than the total deletion data size, taking into account anticipated compression of client data, and fragmentation and defragmentation of client data in the storage system, changes in system files in the storage system that are associated with the backup images of client data, and the like.

The total deletion data size can be calculated using information in the catalog analysis table. The total deletion data size is equal to a summation of data sizes of the files included in the candidate deletion data set, taking into account multiple instances of the files. In other words, a total file data size of each file is determined, and all total file data sizes are summed together, resulting in the total deletion data size. To calculate a total file data size for each file included in the candidate deletion data set, a number of instances of a single file is determined from the image ID list of the catalog analysis table entry for the file. An image ID list in the entry for the file contains an image ID for each instance of the file. The total number of image IDs entered in the image ID list indicates a total number of instances of a file. This number of instances can then be multiplied by the data size included in the catalog analysis table entry for the file, which results in a total file data size for the file. After calculating total file data sizes for each file included in the candidate deletion data set, the total file data sizes are summed to result in the total deletion data size of the candidate deletion data set.

If a segment level analysis is implemented, then the total deletion data size can be calculated using information in the segment analysis table. The total deletion data size is equal to a summation of segment sizes of the file segments included in the candidate deletion data set, taking into account multiple instances of the file segments. In other words, a total segment size of each file segment is determined, and all total segment sizes are summed together, resulting in the total deletion data size. To calculate a total segment size for each file segment, a segment occurrence count of a file segment is multiplied by a segment size of the file segment. Both the segment occurrence count and segment size can be found in the segment analysis table entry for the file segment. This multiplication results in the total segment size for the file segment. After calculating total segment sizes for each file segment included in the candidate deletion data set, the total segment sizes are summed to result in the total deletion data size of the candidate deletion data set.

If an entry of a catalog analysis table includes a Boolean value in a segment availability column that indicates segment data of a file was unavailable, then a total segment size cannot be calculated for any of the file segments of that file (since entries for those file segments were not created during the segment level analysis). Instead, a total file data size can be calculated for the file from the catalog analysis table (as discussed above), which can be added with the other total segment sizes calculated from the segment analysis table to result in the total deletion data size.

A total unique data size of the candidate deletion data set can also be calculated using information from the catalog analysis table. The total unique data size is equal to a summation of data sizes of the unique files included in the candidate deletion data set, or a summation of a data size of a single instance of each of the files in the candidate deletion data set. For each file included in the candidate deletion data set, a data size of each catalog analysis table entry (and thus of each file) is summed together, resulting in a total unique data size for the candidate deletion data set.

If a segment level analysis is implemented, a total unique data size of the candidate deletion data set can be calculated using information from the segment analysis table. The total unique data size is equal to a summation of segment sizes of the unique file segments included in the candidate deletion data set, or a summation of a segment size of a single instance of each of the file segments in the candidate deletion data set. For each file segment included in the candidate deletion data set, a segment size of each segment analysis table entry (and thus of each file segment) is summed together, resulting in a total unique data size for the candidate deletion data set. If a segment availability column indicates file segment data is unavailable, a data size of the catalog analysis table entry for the file can be added with the other segment sizes of the (single instance) file segments, resulting in the total unique data size. Thus, the total unique data size that is calculated using information from the segment analysis table provides a much more accurate account of unique data, since file segments provide finer granularity of client data and provide additional information about how much unique and duplicate data is contained in the client data of the candidate deletion data set.

The storage calculation continues to step 704, calculating a second prospective amount of storage that can be freed if the client data of the candidate archival data set is archived. In one embodiment, if a file is included in both a candidate deletion data set and a candidate archival data set, and the archival data set is archived, then the file is archived and is no longer a candidate file in the candidate deletion data set. Once a candidate archival data set is archived, the storage no longer occupied by the archived client data is freed and can be reclaimed by the storage system for other purposes.

The second prospective amount of storage that can be freed upon archiving the candidate archival data set corresponds to a total archival data size of the candidate archival data set. The second prospective amount of storage can be more or less than the total archival data size, taking into account anticipated compression of client data, and fragmentation and defragmentation of client data in the storage system, changes in system files in the storage system that are associated with the backup images of client data, and the like.

The total archival data size can be calculated using information in the catalog analysis table. The total archival data size is equal to a summation of data sizes of the files included in the candidate archival data set, taking into account multiple instances of the files. The total archival data size can be determined by calculating a total data size for each file in the candidate archival data set, and summing the total data sizes to result in the total archival data size. Calculating the total data sizes of each file is discussed above.

If a segment level analysis is implemented, then the total archival data size can be calculated using information in the segment analysis table. The total archival data size can be determined by calculating a total segment size for each file segment in the candidate archival data set, and summing the total segment sizes to result in the total archival data size. Calculating the total segment sizes of each file segment is discussed above. If a segment availability column indicates file segment data of a file is unavailable, a total data size of the file can be added to the total segment sizes to result in the total archival data size, as discussed above.

A total unique data size of the candidate archival data set can also be calculated using information from the catalog analysis table. The total unique data size is equal to a summation of data sizes of the unique files included in the candidate archival data set, or a summation of a data size of a single instance of each of the files in the candidate archival data set. For each file included in the candidate archival data set, a data size of each catalog analysis table entry (and thus of each file) is summed together, resulting in a total unique data size for the candidate archival data set.

If a segment level analysis is implemented, a total unique data size of the candidate archival data set can also be calculated using information from the segment analysis table. The total unique data size is equal to a summation of segment sizes of unique file segments included in the candidate archival data set, or a summation of a segment size of a single instance of each of the file segments in the candidate archival data set. For each file segment included in the candidate archival data set, a segment size of each segment analysis table entry (and thus of each file segment) is summed together, resulting in a total unique data size for the candidate archival data set. If a segment availability column indicates file segment data of a file is unavailable, a data size of the catalog analysis table entry for the file can be added with the segment sizes of the (single instance) file segments, resulting in the total unique data size. Thus, the total unique data size that is calculated using information from the segment analysis table provides a much more accurate account of unique data, since file segments provide finer granularity of client data and provide additional information about how much unique and duplicate data is contained in the client data of the candidate archival data set.

The storage calculation process then continues to step 706, calculating a total amount of storage savings from the combination of the prospective amounts of storage. The total amount of storage savings is also prospective in nature, and is dependent upon whether the candidate deletion data set is deleted and whether the candidate archival data set is archived.

The client data included in the candidate deletion data set occupies an amount of storage in the storage system. If the candidate deletion data set were deleted, this storage would no longer be occupied by the client data of the candidate deletion data set, meaning that the storage would be freed. One way to estimate the amount of storage freed if the candidate deletion data set were deleted is to calculate a total deletion data size of the candidate deletion data set. As noted above, the total deletion data size corresponds to this amount of freed storage, also referred to as the first prospective amount of freed storage.

Similarly, the client data in the candidate archival data set occupies an amount of storage in the storage system. If the candidate archival data set were archived, this storage would no longer be occupied by the client data of the candidate archival data set, meaning that the storage would be freed. This amount of storage freed if the candidate archival data set were archived can be estimated by calculating a total archival data size of the candidate archival data set. As noted above, the total archival data size corresponds to this amount of freed storage, also referred to as the second prospective amount of freed storage.

The total amount of storage savings can be estimated by summing the first and second prospective amounts of freed storage, if the candidate deletion data set does not overlap any files with the candidate archival data set. The total amount of storage savings indicates an amount of storage that will no longer be occupied by client data, if the candidate deletion and archival data sets are deleted and archived, respectively. If there is overlap between the candidate deletion and archival data sets (i.e., at least one file is included in both the candidate deletion and archival data sets), then the total amount of storage savings can be estimated by determining the freed storage of the union of the candidate deletion and archival data sets, or by reducing the sum of the first and second prospective amounts by the data size of the overlap in order to avoid the freed storage of the overlap being counted twice. The overlap subset can be determined by comparing the files in the candidate deletion and archival data sets to determine files that are included in both data sets. Total data sizes of the files included in the overlap subset can be summed to result in the data size of the overlap. Total data sizes are calculated as discussed above.

Additional optional calculations can be performed in step 706, including calculating a total unique data size for each policy of a client. For example, a total unique data size can be calculated for a candidate deletion or archival data set (as discussed above), but by also limiting the files included in that calculation according to the specified client name and policy name. A total data size can also be calculated for each client-policy combination, where a total data size can be calculated (as discussed above), but by limiting the files included in that calculation according to the specified client name and policy name.

A total amount of the complete analysis data set can also be calculated, using the catalog analysis table. For every file included in the complete analysis data, a total data size can be calculated, as discussed above. The total data sizes can be summed to result in the total amount of the complete analysis data set. A total unique data size for a complete analysis data set can also be calculated using the catalog analysis table. The total unique data size also indicates the size of unique data stored in archival storage if the complete analysis data set is archived or moved to single instance storage. For each file included in the complete analysis data set, a data size of each catalog analysis table entry (and thus of each file) is summed together, resulting in a total unique data size for the complete analysis data set.

A total amount of the client data (which has been catalogued in a backup catalog or live client catalog) can also be calculated, using the catalog analysis table. For every file included in a catalog analysis table(s), a total data size can be calculated, as discussed above. The total data sizes can be summed to result into the total amount of client data.

Various reports can be provided to illustrate different aspects of the storage calculations, which can include the above-discussed calculations of step 706. One example report can indicate how much data in a candidate deletion data set, candidate archival data set, or complete analysis data set is unique, and compare this amount of unique data to the total data size of the respective data set. For example, only 10% of client data in a candidate archival data set may be unique, indicating to a user that a single instance storage solution would result in a large storage savings, as much as a 90% savings.

Another example report can provide a listing of the files included in a candidate deletion data set, candidate archival data set, or complete analysis data set (also referred to as a data set). For example, one report can display a listing of all files included in a data set, including a client name, a policy name, and a file name of the file. Such a report may also include a total data size of client data included in a data set (where the client data is stored as one or more backup images in a storage system or as live client data in a client system), a unique data size of unique data contained in the data set, and an image ID list that indicates the backup images or locations of the instances of the unique data. Another example report may also provide a listing of all files included in a catalog analysis table(s). A user may also limit such a listing to provide files of a particular client or of a client-policy combination.

Another example report can indicate other prospective savings due to implementing some or all of the prospective storage scheme. For example, a portion of client data from a candidate deletion or archival data set may be deleted or archived, respectively. Thus, the prospective storage savings may not be equal to the total amount of storage savings because less than the total candidate deletion or archival data set was deleted or archived, respectively. In another example, if a portion of live client data is deleted or archived from a client system, the portion of client data no longer needs to be backed up from the client system to backup storage. Thus, less client data needs to be included in a future backup image, and a processing time to produce a future backup image will be reduced. Since the processing time to create a future backup image will be reduced, a backup window during which such a future backup image will be created can also be reduced. Similarly, since less client data is communicated from the client to the data protection application server, an amount of network usage to transmit the client data from the client to the data protection application server (as well as from the data protection application server to a storage server and/or a storage device) will also be reduced.

The example reports discussed herein can display these additional savings as a percentage or amount. Such additional savings can be determined by comparing a prospective amount (such as a prospective storage savings, a data size of a portion of a data set, processing time, backup window, or network usage) to a current or present amount (such as a present amount of storage occupied, total data size of a data set, processing time, backup window, or network usage), respectively. Thus, the reports can indicate prospective savings achieved if some or all of the prospective storage scheme is implemented.

A notification or alert can also be issued to a user, indicating results of the example reports. For example, if a percentage or amount of unique data as compared to a total data size of a data set exceeds some threshold value, or if a total data size of a data set exceeds some threshold value, a notice or alert (e.g., a pop up window, a message, electronic mail, an alert upon opening the user interface or data protection application) can be sent to a user.

An additional optimization process can be performed on client data to identify files that can be de-duplicated. As discussed above, multiple instances of a file may be located in multiple backup images. Rather than maintain storage for each instance, the optimization process can identify files suitable for de-duplication, where the number of instances for a file is reduced. At least one master copy or master instance of a file can be maintained in backup storage (e.g., in a backup image). Other instances of the file can be deleted or removed from backup storage, and a reference to the at least one master copy of the file can be included in backup storage (e.g., in one or more backup images). The reference may occupy a small amount of storage space, but this amount is much less than the amount occupied by a copy of the file. Thus, the amount of client data stored in backup storage can be reduced by eliminating duplicate copies of files. This optimization process offers a user another way to reduce client data stored in backup storage or on a client system.

The optimization process can be executed in a manner similar to the table analysis process of FIG. 6 discussed above, where entries of a catalog analysis table are examined. Files suitable for de-duplication can be identified using criteria defined by a user, where the criteria includes file attributes, as discussed above. Files that possess file attributes that match the de-duplication criteria and do not match the exclusion criteria can be included in a storage optimization data set, which may be an association or data store like the candidate deletion or archival data set, as described above.

Similar to the data sets discussed above, information about the storage optimization data set can be presented to a user in reports and can be used in the calculations of FIG. 7, such as the total amount of storage savings. For example, a prospective third amount of freed storage can be determined by calculating a total unique data size and a total data size for the storage optimization data set, as similarly discussed above. A prospective third amount of freed storage is equal to the total data size, reduced by the unique data size. The total amount of storage savings can be this prospective third amount of freed storage, as an alternative solution presented to a user in addition to the solution of deleting or archiving the candidate deletion and archival data sets. The total amount of storage savings can also be calculated by determining the freed storage of the union of the candidate deletion, candidate archival, and storage optimization data sets, in a manner like that discussed above. A user can also authorize de-duplication of the files included in the storage optimization process using the user interface, in a manner similar to that discussed above.

Similarly, the information in the storage optimization data set can be used to generate reports on the last full backup performed per client and per policy. The report will include the total data transferred as a part of this full backup and the unique data in this transfer. This report will enable the user to understand the data transfer that can be avoided in the full backups if intelligent single instanced based storage/technology is used. This will enable the user to find out the prospective reduction in backup window and network utilization that can be achieved in the full backups if intelligent single instanced based storage/technology is used.

Figure 8:
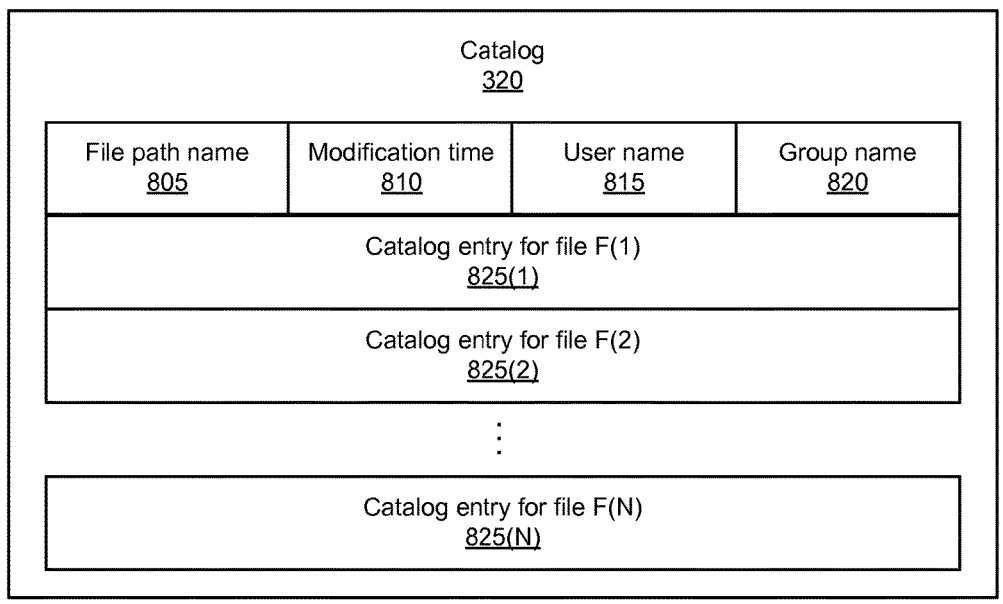
FIG. 8 is a block diagram illustrating relevant components of an example catalog, according to one embodiment.

FIG. 8 is a block diagram illustrating relevant components of an example catalog 320. A catalog entry 825 is created for every file contained in a backup image, even if that file is a duplicate of another file already catalogued in catalog 320. For each file, catalog 320 includes a file path name 805 of the file, a modification time 810 of when the file was modified, and a user name 815 and group name 820 of an owner assigned to the file. Catalog 320 can also include additional information about a file that is not shown, such as an identification of a backup image in which the file is located, an identification of a storage device in which the backup image is located, and an identification of a policy by which the backup image was created. A file path name 805 includes a file name and file extension (which indicates a file type) of the file.

Figure 9A:
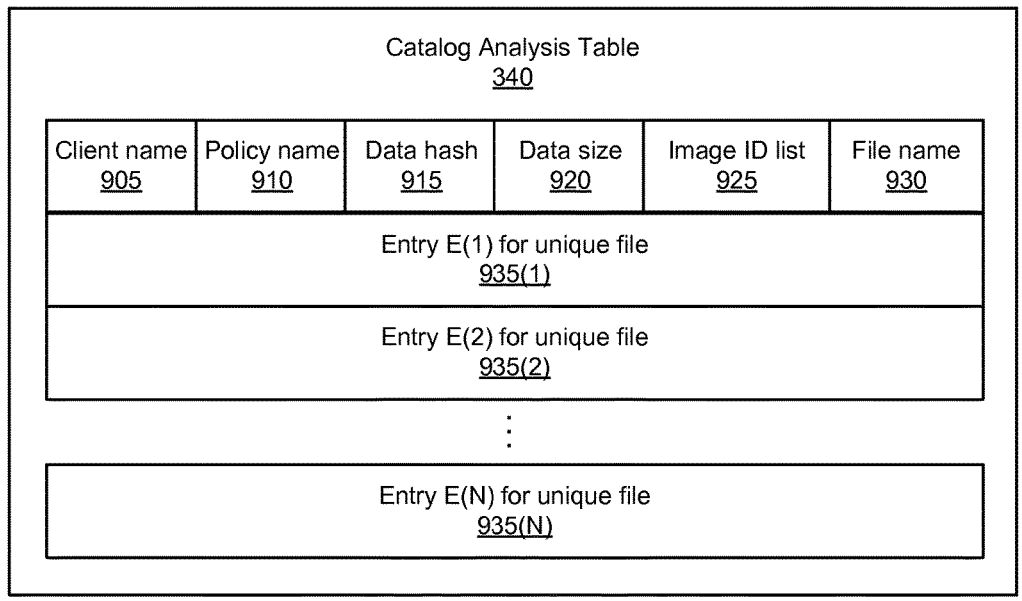
FIG. 9A is a block diagram illustrating relevant components of an example catalog analysis table for a catalog analysis process, according to one embodiment.

FIG. 9A is a block diagram illustrating relevant components of an example catalog analysis table 340 for a catalog analysis process. A catalog analysis table entry 935 is created for every first instance of a file found during the catalog analysis process. For each first file instance, catalog analysis table 340 includes a client name 905 of the client from which the file originated and a policy name 910 of the policy covering the backup of the file. Catalog analysis table 340 also includes a data hash value 915 for the file. Client name 905, policy name 910, and data hash 915 together form a primary key for the catalog analysis table. A catalog analysis table entry can also include a data size 920 of a file. Optionally, a file name 930 of the file can be included in a catalog analysis table entry.

A catalog analysis table entry also includes an image identification (ID) list 925, which is configured to contain multiple values. Image ID list 925 contains an identification of a backup image containing an instance of a file entered in the catalog analysis table entry, as discussed above. Alternatively, an image ID can provide an identification of a location of an instance of client data that is not necessarily a backup image containing the file instance, as also discussed above. Thus, each instance of a file is represented by an image ID in the image ID list for the file.

FIG. 9B is a block diagram illustrating relevant components of an example catalog analysis table 340 for a segment level analysis process. Alternative catalog analysis table 340 of FIG. 9B contains the same information as catalog analysis table 340 of FIG. 9A, with the addition of a segment hash list 940, which is configured to contain multiple values. A segment hash list 940 contains segment hash values for all segments contained in a file. A segment hash value is generated from hashing segment data.

If, for some reason, the segment data of a file segment is unavailable for the segment level analysis to be performed, a segment hash value cannot be generated from the segment data. Thus, instances of unavailable segment data cannot be included in the segment analysis table. In such a scenario, the catalog analysis table of FIG. 9B can also include a segment availability column (not shown) containing a Boolean value that indicates whether the segment hash value of an entry is generated from segment data or from other information. If set (i.e., a value of 1), the segment data is unavailable and not included in the segment level analysis and are not accounted for in the segment analysis table. If not set (i.e., a value of 0), the segment data is available, the segment analysis has been performed on the segment data, and the segment data has been accounted for in the segment analysis table.

FIG. 10 is a block diagram illustrating relevant components of an example segment analysis table 1000 for a segment level analysis process. A segment analysis table entry 1030 is created for every first instance of a file segment found during the segment level analysis. For a first instance of a segment, segment analysis table entry 1030 includes a client name 1005 of the client from which the file segment originated and a policy name 1010 of the policy covering the backup of the file of the file segment. Segment analysis table 1000 also includes a segment hash value 1015 for the file segment. Client name 1005, policy name 1010, and segment hash value 1015 together form a primary key for the segment analysis table.

Segment analysis table 1000 also includes a segment size 1020 of a file segment. Segments can contain an amount of data of a predetermined block size, or can contain an amount of data of variable block size. Segment analysis table 1000 also includes a segment occurrence count 1025 that indicates the number of instances of the file segment.

Figure 11:
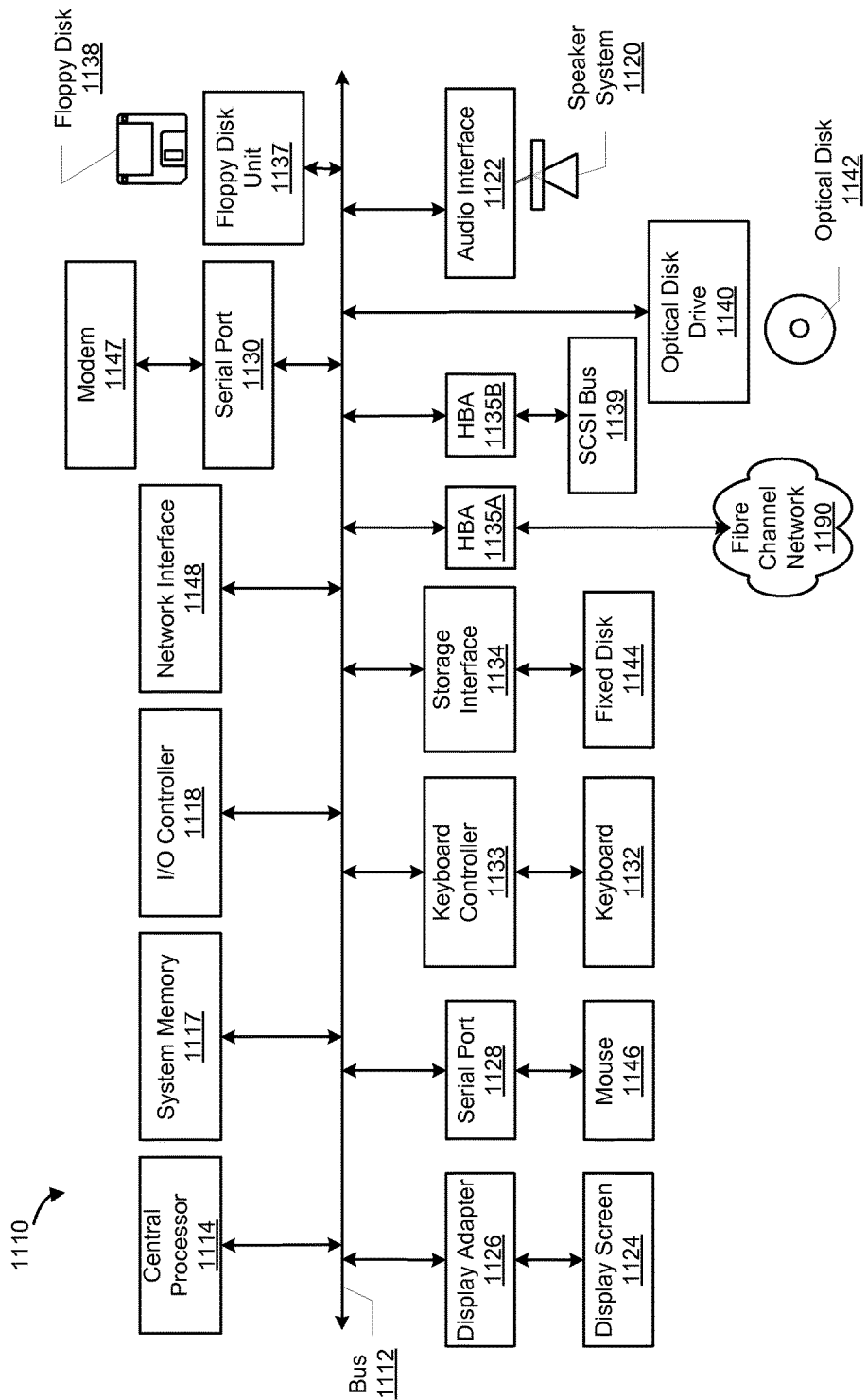
FIG. 11 is a block diagram that illustrates an example of a computer system suitable for implementing embodiments of the present application.

FIG. 11 is a block diagram that illustrates an example of a computer system 1110 that is suitable for implementing the present disclosure. Computer system 1110 may be illustrative of various computer systems in the storage system 100, such as system(s) 110, 120, and/or 150, among others. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. Code for the automatically performing operations on such applications based on their dependencies on other applications (such as described above with reference to the processes of FIGS. 4-7), etc., to implement the present disclosure can be stored in computer-readable storage media such as one or more of system memory 1117, fixed disk 1144, optical disk 1142, or floppy disk 1138. Memory 1117 is also used for storing temporary variables or other intermediate information during the execution of instructions by the processor 1110. The operating system provided on computer system 1110 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
creating a first backup image of a plurality of files;
storing information in a first catalog, wherein
the first catalog comprises a plurality of catalog entries,
the first catalog corresponds to a first client of a plurality of clients,
the first catalog further corresponds to a first data policy associated with the first client,
the first data policy is one of a plurality of data policies associated with the first client, and
the information describes the plurality of files;
determining one or more off-peak hours, wherein
the one or more off-peak hours are characterized by lower than normal network traffic;
hashing, during the one or more off-peak hours, the plurality of catalog entries to produce a hash value associated with each of the catalog entries, wherein
each of the catalog entries comprises information regarding a copy of a respective file stored in the first backup image;
populating, during the one or more off-peak hours, a plurality of table entries in a catalog analysis table, wherein
each table entry of the plurality of table entries comprises
the hash value associated with each respective catalog entry,
information identifying one or more backup images that comprise the respective file associated with the respective catalog entry, and
information identifying one or more data policies of the plurality of data policies that are associated with the respective file;
analyzing, during the one or more off-peak hours, the catalog analysis table to identify a candidate deletion set, wherein
the analyzing comprises, for each table entry in the catalog analysis table,
determining whether the respective file is associated with a second data policy that is associated with a second catalog in order to determine whether the respective file is a candidate for deletion, and
with respect to each respective file that is a candidate for deletion, adding the respective file to a candidate deletion set of files that are candidates for deletion;
determining a first exclusion criteria, wherein
the first exclusion criteria is received from a user;
filtering, during the one or more off-peak hours, the candidate deletion set to exclude one or more files that are candidates for deletion and also satisfy the first exclusion criteria; and
deleting, during the one or more off-peak hours, the candidate deletion set from the first backup image, wherein
the hashing, the populating, the analyzing, and the deleting are performed by a processor of a computing system.

2. The method of claim 1, wherein
the first backup image is generated during at least one backup process performed on live client data stored at a client system,
the first catalog is produced during a backup process, and
the first backup image is stored in a storage system.

3. The method of claim 1, further comprising:
calculating a prospective amount of freed storage, wherein
the prospective amount of freed storage is calculated, at least in part, using the candidate deletion set, and
the prospective amount of freed storage represents storage no longer needed to store the first backup image.

4. The method of claim 3, further comprising:
providing a report to a user, wherein
the report indicates the prospective amount of freed storage.

5. The method of claim 1, further comprising:
cataloguing live client data to produce the first catalog, wherein
a set of data comprises the live client data stored at a client system, and
the cataloguing populates the plurality of catalog entries of the first catalog.

6. The method of claim 1, further comprising:
determining whether a first table entry of the plurality of table entries meets archival criteria to identify a candidate archival data set, wherein
the candidate archival data set comprises a file, in response to a determination that the first table entry meets the archival criteria, and
the candidate archival data set is identified as suitable for being archived.

7. The method of claim 6, further comprising:
calculating a prospective amount of freed storage, wherein
the prospective amount of freed storage is calculated, at least in part, using the candidate archival data set, and
the prospective amount of freed storage represents storage no longer needed to store the first backup image.

8. The method of claim 7, wherein
the archival criteria comprises target file attributes of files that are suitable for being archived.

9. The method of claim 7, further comprising:
determining whether the first table entry meets exclusion criteria to identify files that should be excluded from the candidate archival data set.

10. The method of claim 6, wherein the populating the plurality of table entries comprises:
determining whether the hash value is contained in the catalog analysis table;
in response to determining that the hash value is contained in the catalog analysis table,
adding a location identifier (ID) of the file to an existing table entry of the catalog analysis table, wherein
the existing table entry comprises the hash value, and
the location ID identifies a location in a set of data at which a copy of the first backup image is stored; and
in response to determining that the hash value is not contained in the catalog analysis table,
adding a new table entry to the catalog analysis table, wherein
the new table entry comprises the hash value and the location ID.

11. The method of claim 1, further comprising:
updating, by the processor, one or more of the plurality of table entries after deleting the candidate deletion set.

12. The method of claim 1, wherein
each table entry further comprises
a segment hash list, wherein
the segment hash list comprises a plurality of segment hash values;
the populating further comprises generating a first segment hash value for a first segment of a file; and
the analyzing further comprises comparing the first segment hash value to each of the plurality of segment hash values to determine if the first segment hash value is included in the segment hash list, and
in response to a determination that the first segment hash value corresponds to any of the plurality of segment hash values, adding the first segment to the candidate deletion set.

13. An apparatus comprising:
a processor; and
a memory coupled to the processor and configured to store instructions executable by the processor, the instructions configured to implement
an analysis engine configured to
create a first backup image of a plurality of files;
store information in a first catalog, wherein
the first catalog comprises a plurality of catalog entries,
the first catalog corresponds to a first client of a plurality of clients,
the first catalog further corresponds to a first data policy associated with the first client,
the first data policy is one of a plurality of data policies associated with the first client, and
the information describes the plurality of files;
determine one or more off-peak hours, wherein
the one or more off-peak hours are characterized by lower than normal network traffic;
hash, during the one or more off-peak hours, the plurality of catalog entries to produce a hash value associated with each of the catalog entries, wherein
each of the catalog entries comprises information regarding a copy of a respective file stored in the first backup image;
populate, during the one or more off-peak hours, a plurality of table entries in a catalog analysis table, wherein
each table entry of the plurality of table entries comprises
the hash value associated with each respective catalog entry,
information identifying one or more backup images that comprise the respective file associated with the respective catalog entry, and
information identifying one or more data policies of the plurality of data policies that are associated with the respective file;
analyze, during the one or more off-peak hours, the catalog analysis table to identify a candidate deletion set, wherein
analyzing the catalog analysis table comprises, for each table entry in the catalog analysis table,
determining whether the respective file is associated with a second data policy that is associated with a second catalog in order to determine whether the respective file is a candidate for deletion, and
with respect to each respective file that is a candidate for deletion, adding the respective file to a candidate deletion set of files that are candidates for deletion;
determine a first exclusion criteria, wherein
the first exclusion criteria is received from a user;
filter, during the one or more off-peak hours, the candidate deletion set to exclude one or more files that are candidates for deletion and also satisfy the first exclusion criteria; and
delete the candidate deletion set from the first backup image during the one or more off-peak hours.

14. The apparatus of claim 13, wherein
the first backup image is generated during at least one backup process performed on live client data stored at a client system,
the first catalog is produced during a backup process, and
the first backup image is stored in a storage system.

15. The apparatus of claim 13, further comprising:
a catalog module configured to
catalogue live client data to produce the first catalog, wherein
a set of data comprises the live client data stored at a client system, and
the plurality of catalog entries of the first catalog are populated.

16. The apparatus of claim 13, wherein
the analysis engine is further configured to
determine whether a first table entry of the plurality of table entries meets archival criteria to identify a candidate archival data set, wherein
the candidate archival data set comprises a file, in response to a determination that the first table entry meets the archival criteria, and
the candidate archival data set is identified as suitable for being archived.

17. The apparatus of claim 16, wherein
the analysis engine is further configured to
calculate a prospective amount of freed storage, wherein
the prospective amount of freed storage is calculated, at least in part, using the candidate archival data set, and
the prospective amount of freed storage represents storage no longer needed to store the first backup image.

18. The apparatus of claim 17, wherein
the archival criteria comprises target file attributes of files that are suitable for being archived.

19. A non-transitory computer readable storage medium configured to store instructions that, when executed by a processor, are configured to cause the processor to implement a method comprising:
creating a first backup image of a plurality of files;
storing information in a first catalog, wherein
the first catalog comprises a plurality of catalog entries,
the first catalog corresponds to a first client of a plurality of clients,
the first catalog further corresponds to a first data policy associated with the first client,
the first data policy is one of a plurality of data policies associated with the first client, and
the information describes the plurality of files;
determining one or more off-peak hours, wherein
the one or more off-peak hours are characterized by lower than normal network traffic;
hashing, during the one or more off-peak hours, the plurality of catalog entries to produce a hash value associated with each of the catalog entries, wherein
each of the catalog entries comprises information regarding a copy of a respective file stored in the first backup image;
populating, during the one or more off-peak hours, a plurality of table entries in a catalog analysis table, wherein
each table entry of the plurality of table entries comprises
the hash value associated with each respective catalog entry,
information identifying one or more backup images that comprise the respective file associated with the respective catalog entry, and
information identifying one or more data policies of the plurality of data policies that are associated with the respective file;
analyzing, during the one or more off-peak hours, the catalog analysis table to identify a candidate deletion set, wherein
the analyzing comprises, for each table entry in the catalog analysis table,
determining whether the respective file is associated with a second data policy that is associated with a second catalog in order to determine whether the respective file is a candidate for deletion, and
with respect to each respective file that is a candidate for deletion, adding the respective file to a candidate deletion set of files that are candidates for deletion;
determining a first exclusion criteria, wherein
the first exclusion criteria is received from a user;
filtering, during the one or more off-peak hours, the candidate deletion set to exclude one or more files that are candidates for deletion and also satisfy the first exclusion criteria;
and
deleting, during the one or more off-peak hours, the candidate deletion set from the first backup image.

* * * * *